US012786474B2

(12) United States Patent
Chen et al.

(10) Patent No.: US 12,786,474 B2
(45) Date of Patent: Nov. 3, 2026

(54) ADAPTIVE PICTURE MODIFICATIONS FOR VIDEO CODING

(71) Applicant: BEIJING DAJIA INTERNET INFORMATION TECHNOLOGY CO., LTD., Beijing (CN)

(72) Inventors: Yi-Wen Chen, San Diego, CA (US); Ning Yan, San Diego, CA (US); Xiaoyu Xiu, San Diego, CA (US); Che-Wei Kuo, San Diego, CA (US); Hong-Jheng Jhu, San Diego, CA (US); Wei Chen, San Diego, CA (US); Xianglin Wang, San Diego, CA (US); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/886,724

(22) Filed: Sep. 16, 2024

(65) Prior Publication Data

US 2025/0016377 A1 Jan. 9, 2025

Related U.S. Application Data

(63) Continuation of application No. PCT/US2023/015383, filed on Mar. 16, 2023.
(Continued)

(51) Int. Cl.
*H04N 19/70* (2014.01)
*H04N 19/172* (2014.01)
(Continued)

(52) U.S. Cl.
CPC ........... *H04N 19/70* (2014.11); *H04N 19/172* (2014.11); *H04N 19/174* (2014.11); *H04N 19/186* (2014.11); *H04N 19/60* (2014.11)

(58) Field of Classification Search
CPC ....... H04N 19/136; H04N 19/70; G06T 9/001
See application file for complete search history.

(56) References Cited

U.S. PATENT DOCUMENTS 11,166,040 B2 11/2021 Ko et al.
2007/0160310 A1* 7/2007 Tanida .................. H04N 25/00 348/E5.091
(Continued)

FOREIGN PATENT DOCUMENTS

KR 20120072354 A 7/2012
KR 20190006967 A 1/2019
(Continued)

OTHER PUBLICATIONS

International Search Report issued in PCT application No. PCT/US2023/015383 dated Jun. 30, 2023, (4p).
(Continued)

*Primary Examiner* — Fabio S Lima
(74) *Attorney, Agent, or Firm* — Arch & Lake LLP; Hao Tan; Shen Wang

(57) ABSTRACT

Methods for video coding and compression, apparatuses and non-transitory storage media are provided. In one method of video decoding, a decoder may obtain a syntax element that indicates a predefined geometric operation and an encoded video bitstream. Additionally, the decoder may reconstruct a modified picture based on the encoded video bitstream. Furthermore, the decoder may obtain an original picture by performing an inverse geometry operation based on the syntax element. Further, the decoder may obtain luma samples and chroma samples of the original picture.

18 Claims, 11 Drawing Sheets

Related U.S. Application Data

(60) Provisional application No. 63/320,680, filed on Mar. 16, 2022.

(51) Int. Cl.

| | |
|---|---|
| ***H04N 19/174*** | (2014.01) |
| ***H04N 19/186*** | (2014.01) |
| ***H04N 19/60*** | (2014.01) |

(56) References Cited

U.S. PATENT DOCUMENTS

| | | | | |
|---|---|---|---|---|
| 2020/0195952 | A1 | 6/2020 | Choi | |
| 2020/0404279 | A1* | 12/2020 | Choi | H04N 19/132 |
| 2021/0112268 | A1 | 4/2021 | Ko et al. | |
| 2021/0306673 | A1* | 9/2021 | Sarwer | H04N 19/182 |
| 2021/0329303 | A1* | 10/2021 | Deshpande | H04N 19/70 |
| 2023/0085937 | A1* | 3/2023 | Deshpande | H04N 19/85 375/240.26 |
| 2025/0267281 | A1* | 8/2025 | Andrivon | H04N 19/117 |

FOREIGN PATENT DOCUMENTS

| | | | |
|---|---|---|---|
| KR | 20210006390 | A | 1/2021 |
| WO | 2014109273 | A1 | 7/2014 |
| WO | 2018067952 | A1 | 4/2018 |
| WO | 2021170095 | A1 | 9/2021 |
| WO | 2021233450 | A1 | 11/2021 |

OTHER PUBLICATIONS

Extended European Search Report of EP Application No. 23771408.4 dated Feb. 3, 2026, (18p).

Murakami, Tomokazu, "Adaptive Picture Flipping Coding for Enhancing H.264/AVC," Central Research Laboratory, Hitachi, Ltd.—XP-002461400, (4p).

Bross, Benjamin, et al., "Versatile Video Coding (Draft 7)," Joint Video Experts Team (JVET) of ITU-T SG 16 WP 3 and ISO/IEC JTC 1/SC 2/WG 11, JVET-P2001, 16th Meeting Geneva, CH Oct. 1-11, 2019, (494p).

Andrivon, Pierre, "Cross-check of JVET-AB0165 (EE2-1.16: Picture-level geometry transform)," Joint Video Experts Team (JVET) of ITU-T SG 16 WP 3 and ISO/IEC JTC 1/SC 29, JVET-AB0207-v1, 28th Meeting, Mainz, DE Oct. 2-28, 2022, (4p).

Jia, Wei et al., "EE2-1.16: Picture-level geometry transform," Joint Video Experts (JVET) of ITU-T SG 16 WP 3 and ISO/IEC JTC 1/SC 29, JVET-AB0165, 28th Meeting, Mainz, DE, Oct. 20-28, 2022, (2p).

* cited by examiner

ADAPTIVE PICTURE MODIFICATIONS FOR VIDEO CODING

CROSS-REFERENCE TO RELATED APPLICATIONS

The present application is a Continuation Application of International Application No. PCT/US2023/015383, filed on Mar. 16, 2023, which is filed upon and claims priority to U.S. Provisional Application No. 63/320,680, entitled "Adaptive Picture Modifications for Video Coding" filed on Mar. 16, 2022, the entireties of which are incorporated by reference for all purposes.

FIELD

The present disclosure relates to video coding and compression, and in particular but not limited to, methods and apparatuses for the processing of the coding pictures for video coding.

BACKGROUND

Various video coding techniques may be used to compress video data. Video coding is performed according to one or more video coding standards. For example, nowadays, some well-known video coding standards include Versatile Video Coding (VVC), High Efficiency Video Coding (HEVC, also known as H.265 or MPEG-H Part2) and Advanced Video Coding (AVC, also known as H.264 or MPEG-4 Part 10), which are jointly developed by ISO/IEC MPEG and ITU-T VECG. AOMedia Video 1 (AV1) was developed by Alliance for Open Media (AOM) as a successor to its preceding standard VP9. Audio Video Coding (AVS), which refers to digital audio and digital video compression standard, is another video compression standard series developed by the Audio and Video Coding Standard Workgroup of China. Most of the existing video coding standards are built upon the famous hybrid video coding framework i.e., using block-based prediction methods (e.g., inter-prediction, intra-prediction) to reduce redundancy present in video images or sequences and using transform coding to compact the energy of the prediction errors. An important goal of video coding techniques is to compress video data into a form that uses a lower bit rate while avoiding or minimizing degradations to video quality.

The first version of the HEVC standard was finalized in October 2013, which offers approximately 50% bit-rate saving or equivalent perceptual quality compared to the prior generation video coding standard H.264/MPEG AVC. Although the HEVC standard provides significant coding improvements than its predecessor, there is evidence that superior coding efficiency can be achieved with additional coding tools over HEVC. Based on that, both VCEG and MPEG started the exploration work of new coding technologies for future video coding standardization. One Joint Video Exploration Team (JVET) was formed in October 2015 by ITU-T VECG and ISO/IEC MPEG to begin significant study of advanced technologies that could enable substantial enhancement of coding efficiency. One reference software called joint exploration model (JEM) was maintained by the JVET by integrating several additional coding tools on top of the HEVC test model (HM).

In October 2017, the joint call for proposals (CfP) on video compression with capability beyond HEVC was issued by ITU-T and ISO/IEC. In April 2018, 23 CfP responses were received and evaluated at the 10-th JVET meeting, which demonstrated compression efficiency gain over the HEVC around 40%. Based on such evaluation results, the JVET launched a new project to develop the new generation video coding standard that is named as Versatile Video Coding (VVC). In the same month, one reference software codebase, called VVC test model (VTM), was established for demonstrating a reference implementation of the VVC standard.

Moreover, ITU-T VCEG (Q6/16) and ISO/IEC MPEG (JTC 1/SC 29/WG 11) are studying the potential need for standardization of future video coding technology with a compression capability that significantly exceeds that of the current VVC standard. Such future standardization action may either take the form of additional extension(s) of VVC or an entirely new standard. The Joint Video Exploration Team (JVET) is working on this exploration activity to evaluate compression technology designs proposed by their experts in this area. The first Exploration Experiments (EE) were established in JVET meeting during 6-15 Jan. 2021 and this exploration software model is named as Enhanced Compression Model (ECM) and ECM version2 (ECM2) was released on August 2021.

SUMMARY

The present disclosure provides examples of techniques relating to video coding and compression, and in particular relating to methods and apparatuses for the processing of the coding pictures for video coding According to a first aspect of the present disclosure, there is provided a method of video encoding. In the method of video encoding, an encoder may obtain luma samples and chroma samples of a picture based on an input video sequence. Additionally, the encoder may determine a predefined geometric operation. Furthermore, the encoder may obtain a modified picture by performing the predefined geometric operation to the luma samples and the chroma samples of the picture of the input video sequence. Further, the encoder may encode the modified picture.

According to a second aspect of the present disclosure, there is provided a method of video decoding. In the method of video decoding, a decoder may obtain a syntax element that indicates a predefined geometric operation and encoded video bitstream. Additionally, the decoder may reconstruct a modified picture based on encoded video bitstream. Furthermore, the decoder may obtain an original picture by performing an inverse geometry operation based on the syntax element. Further, the decoder may obtain luma samples and chroma samples of the original picture.

According to a third aspect of the present disclosure, there is provided an apparatus for video encoding. The apparatus includes one or more processors and a memory coupled to the one or more processors and configured to store instructions executable by the one or more processors. Furthermore, the one or more processors, upon execution of the instructions, are configured to perform the method according to the first aspect above.

According to a fourth aspect of the present disclosure, there is provided an apparatus for video decoding. The apparatus includes one or more processors and a memory coupled to the one or more processors and configured to store instructions executable by the one or more processors. Furthermore, the one or more processors, upon execution of the instructions, are configured to perform the method according to the second aspect above.

According to a fifth aspect of the present disclosure, there is provided a non-transitory computer-readable storage medium storing computer-executable instructions that, when executed by one or more computer processors, cause the one or more computer processors to receive a bitstream, and perform the method according to the first aspect.

According to a sixth aspect of the present disclosure, there is provided a non-transitory computer-readable storage medium storing computer-executable instructions that, when executed by one or more computer processors, cause the one or more computer processors to perform the method according to the second aspect to encode the current block into a bitstream, and transmit the bitstream.

BRIEF DESCRIPTION OF THE DRAWINGS

A more particular description of the examples of the present disclosure will be rendered by reference to specific examples illustrated in the appended drawings. Given that these drawings depict only some examples and are not therefore considered to be limiting in scope, the examples will be described and explained with additional specificity and details through the use of the accompanying drawings.

DETAILED DESCRIPTION

Figure 1A:
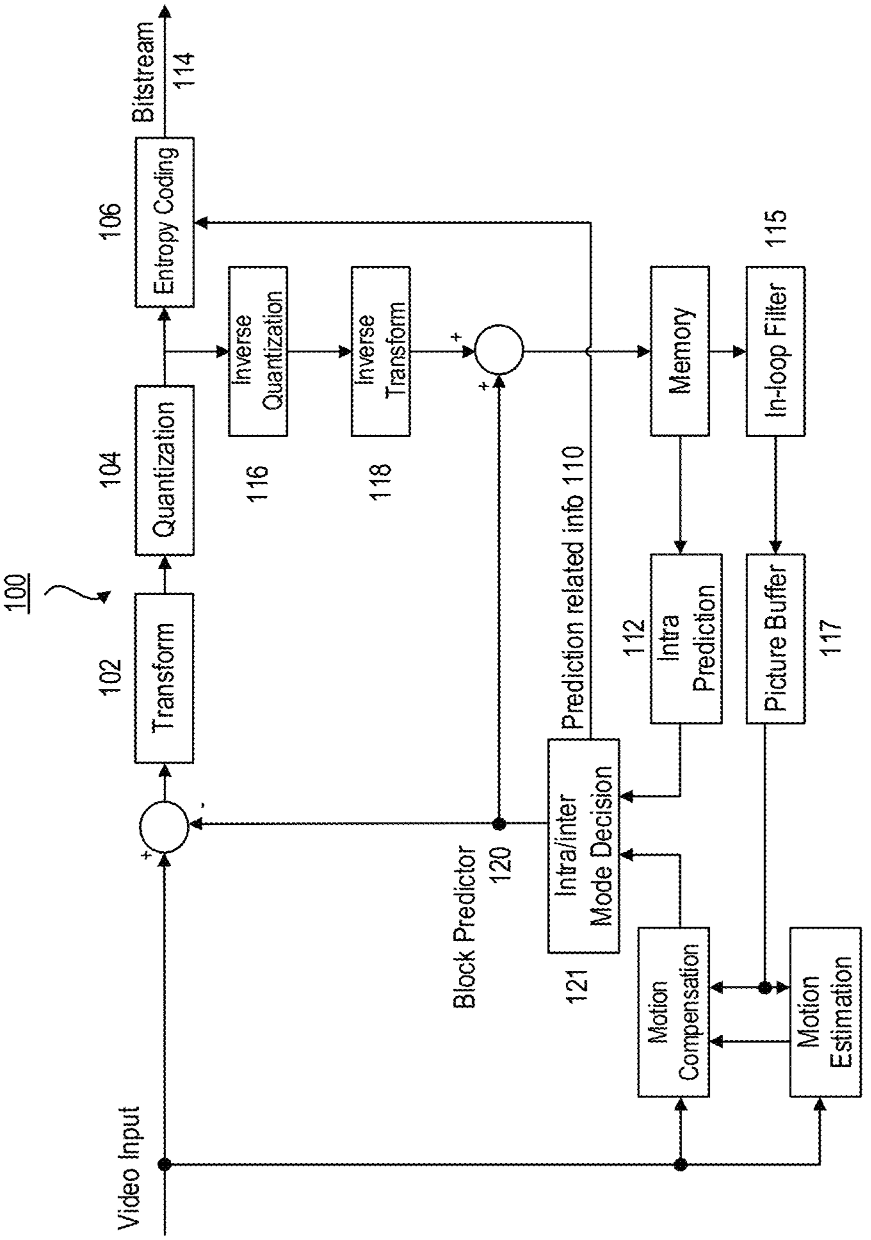
FIG. 1A is a block diagram of a video encoder in accordance with some examples of the present disclosure.

Reference will now be made in detail to specific implementations, examples of which are illustrated in the accompanying drawings. In the following detailed description, numerous non-limiting specific details are set forth in order to assist in understanding the subject matter presented herein. The subject matter presented herein can be implemented on many types of electronic devices with digital video capabilities.

Terms used in the disclosure are only adopted for the purpose of describing specific embodiments and not intended to limit the disclosure. "A/an," "said," and "the" in a singular form in the disclosure and the appended claims are also intended to include a plural form, unless other meanings are clearly denoted throughout the disclosure. Term "and/or" used in the disclosure refers to and includes one or any or all possible combinations of multiple associated items that are listed.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Throughout the disclosure, the terms "first," "second," "third," etc. are all used as nomenclature only for references to relevant elements, e.g., devices, components, compositions, steps, etc., without implying any spatial or chronological orders, unless expressly specified otherwise. For example, a "first device" and a "second device" may refer to two separately formed devices, or two parts, components, or operational states of a same device, and may be named arbitrarily.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

As used herein, the term "if" or "when" may mean "upon" or "in response to" depending on the context. These terms, if appear in a claim, may not indicate that the relevant limitations or features are conditional or optional. For example, a method may comprise steps of: i) when or if condition X is present, function or action X' is performed, and ii) when or if condition Y is present, function or action Y' is performed. The method may be implemented with both the capability of performing function or action X', and the capability of performing function or action Y'. Thus, the functions X' and Y' may both be performed, at different times, on multiple executions of the method.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

FIG. 1A is a block diagram of a video encoder in accordance with some implementations of the present disclosure. Like HEVC, VVC is built upon the block-based hybrid video coding framework. In the encoder 100, the input video signal is processed block by block, called coding units (CUs). In VTM-1.0, a CU can be up to 128×128 pixels. However, different from the HEVC which partitions blocks only based on quad-trees, in VVC, one coding tree unit (CTU) is split into CUs to adapt to varying local characteristics based on quad/binary/ternary-tree.

Additionally, the concept of multiple partition unit type in the HEVC is removed, i.e., the separation of CU, prediction unit (PU) and transform unit (TU) does not exist in the VVC anymore; instead, each CU is always used as the basic unit for both prediction and transform without further partitions. In the multi-type tree structure, one CTU is firstly partitioned by a quad-tree structure. Then, each quad-tree leaf node can be further partitioned by a binary and ternary tree structure.

Figures 2A, 2B, 2C, 2D, 2E:
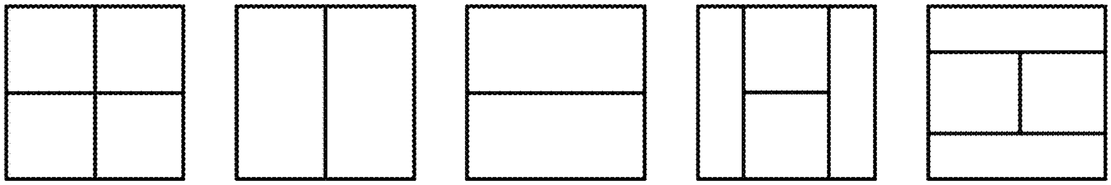
FIGS. 2A-2E are schematic diagrams illustrating different block partitions in a multi-type tree structure in accordance with some examples of the present disclosure.

FIGS. 2A-2E are schematic diagrams illustrating multi-type tree splitting modes in accordance with some implementations of the present disclosure. FIGS. 2A-2E respectively show five splitting types including quaternary partitioning (FIG. 2A), vertical binary partitioning (FIG. 2B), horizontal binary partitioning (FIG. 2C), vertical extended ternary partitioning (FIG. 2D), and horizontal extended ternary partitioning (FIG. 2E).

For each given video block, spatial prediction and/or temporal prediction may be performed. Spatial prediction (or "intra prediction") uses pixels from the samples of already coded neighboring blocks (which are called reference samples) in the same video picture or slice to predict the current video block. Spatial prediction reduces spatial redundancy inherent in the video signal. Temporal prediction (also referred to as "inter prediction" or "motion compensated prediction") uses reconstructed pixels from the already coded video pictures to predict the current video block. Temporal prediction reduces temporal redundancy inherent in the video signal. Temporal prediction signal for a given CU is usually signaled by one or more motion vectors (MVs) which indicate the amount and the direction of motion between the current CU and its temporal reference.

Also, if multiple reference pictures are supported, one reference picture index is additionally sent, which is used to identify from which reference picture in the reference picture store the temporal prediction signal comes. After spatial and/or temporal prediction, an intra/inter mode decision circuitry 121 in the encoder 100 chooses the best prediction mode, for example based on the rate-distortion optimization method. The block predictor 120 is then subtracted from the current video block; and the resulting prediction residual is de-correlated using the transform circuitry 102 and the quantization circuitry 104. The resulting quantized residual coefficients are inverse quantized by the inverse quantization circuitry 116 and inverse transformed by the inverse transform circuitry 118 to form the reconstructed residual, which is then added back to the prediction block to form the reconstructed signal of the CU. Further, in-loop filtering 115, such as a deblocking filter, a sample adaptive offset (SAO), and/or an adaptive in-loop filter (ALF) may be applied on the reconstructed CU before it is put in the reference picture store of the picture buffer 117 and used to code future video blocks. To form the output video bitstream 114, coding mode (inter or intra), prediction mode information, motion information, and quantized residual coefficients are all sent to the entropy coding unit 106 to be further compressed and packed to form the bit-stream.

Figure 1B:
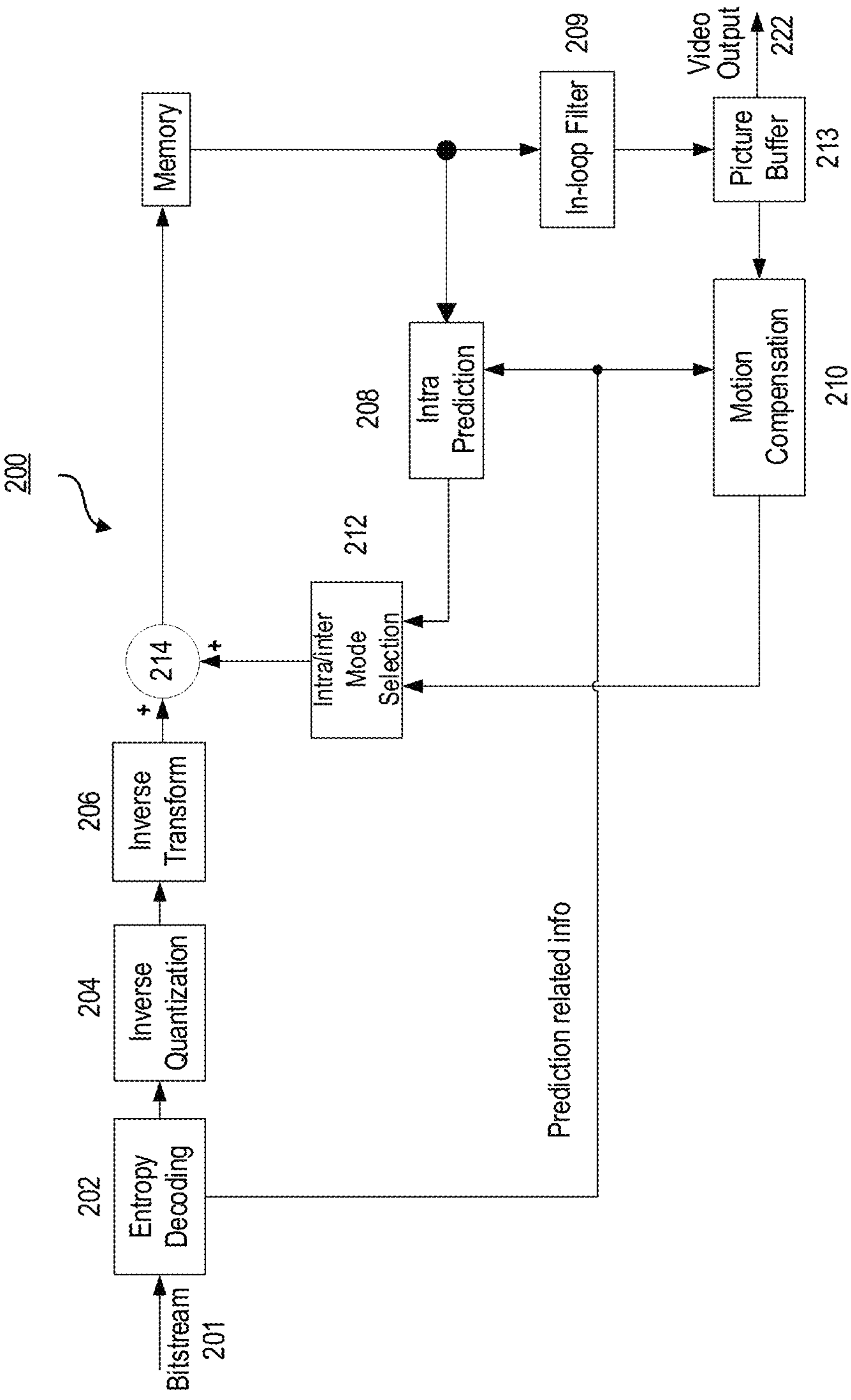
FIG. 1B is a block diagram of a video decoder in accordance with some examples of the present disclosure.

FIG. 1B is a block diagram of a video decoder in accordance with some examples of the present disclosure. In the decoder 200, the video bit-stream 201 is first entropy decoded at an entropy decoding unit 202. The coding mode and prediction information are sent to either the spatial prediction unit (if intra coded) or the temporal prediction unit (if inter coded) to form the prediction block. The residual transform coefficients are sent to inverse quantization unit 204 and inverse transform unit 206 to reconstruct the residual block. The prediction block and the residual block are then added together. The reconstructed block may further go through in-loop filtering 209 before it is stored in reference picture buffer 213. The reconstructed video in reference picture buffer 213 is then sent out to drive a display device, as well as used to predict future video blocks.

For each inter-predicted CU, motion parameters consisting of motion vectors, reference picture indices and reference picture list usage index, and additional information needed for the new coding feature of VVC may be used for inter-predicted sample generation. The motion parameters may be signaled in an explicit or implicit manner. When a CU is coded with skip mode, the CU is associated with one PU and has no significant residual coefficients, no coded motion vector delta (motion vector difference) or reference picture index. A merge mode is specified whereby the motion parameters for the current CU are obtained from neighboring CUs, including spatial and temporal candidates, and additional schedules introduced in VVC. The merge mode may be applied to any inter-predicted CU, not only for skip mode. The alternative to merge mode is the explicit transmission of motion parameters, where motion vector, corresponding reference picture index for each reference picture list and reference picture list usage flag and other needed information are signaled explicitly per each CU.

Chroma Sampling Structure in VVC

In the VVC specification, the variables SubWidthC and SubHeightC are specified in Table 1, depending on the chroma format sampling structure, which is specified through sps_chroma_format_idc.

TABLE 1

SubWidthC and SubHeightC values derived from sps_chroma_format_idc

| sps_chroma_format_idc | Chroma format | SubWidthC | SubHeightC |
|---|---|---|---|
| 0 | Monochrome | 1 | 1 |
| 1 | 4:2:0 | 2 | 2 |
| 2 | 4:2:2 | 2 | 1 |
| 3 | 4:4:4 | 1 | 1 |

In monochrome sampling, there is only one sample array, which is nominally considered the luma array.

In 4:2:0 sampling, each of the two chroma arrays has half the height and half the width of the luma array.

In 4:2:2 sampling, each of the two chroma arrays has the same height and half the width of the luma array.

In 4:4:4 sampling, each of the two chroma arrays has the same height and width as the luma array.

The number of bits necessary for the representation of each of the samples in the luma and chroma arrays in a video sequence is in the range of 8 to 16, inclusive.

Figure 6A:
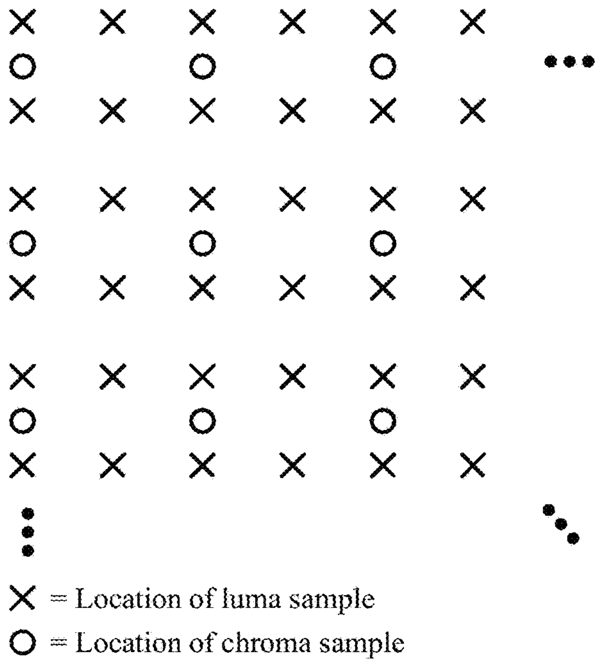
FIG. 6A is a diagram illustrating nominal vertical and horizontal locations of 4:2:0 luma samples and chroma samples in accordance with some examples of the present disclosure.

When the value of sps_chroma_format_idc is equal to 1, the nominal vertical and horizontal relative locations of luma samples and chroma samples in pictures are as shown in FIG. 6A. Alternative chroma sample relative locations may be indicated in VUI parameters as specified in Rec. ITU-T H.274 | ISO/IEC 23002-7.

Figure 6B:
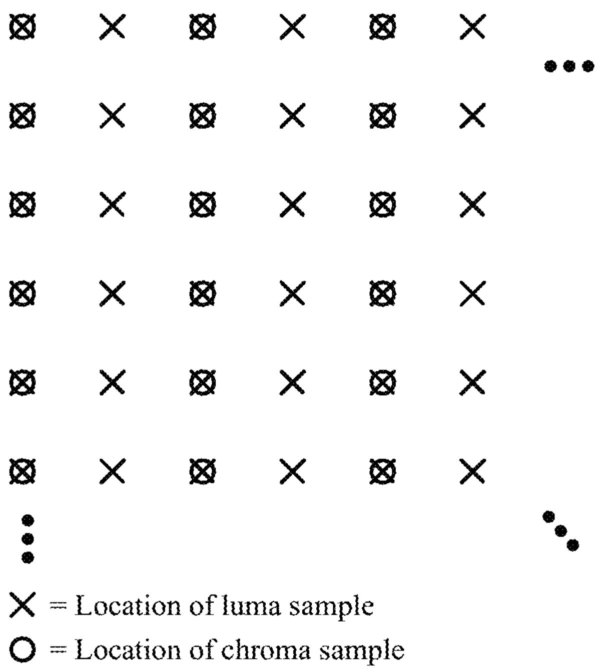
FIG. 6B is a diagram illustrating nominal vertical and horizontal locations of 4:2:2 luma samples and chroma samples in accordance with some examples of the present disclosure.

When the value of sps_chroma_format_idc is equal to 2, the chroma samples are co-sited with the corresponding luma samples and the nominal locations in a picture are as shown in FIG. 6B.

Figure 6C:
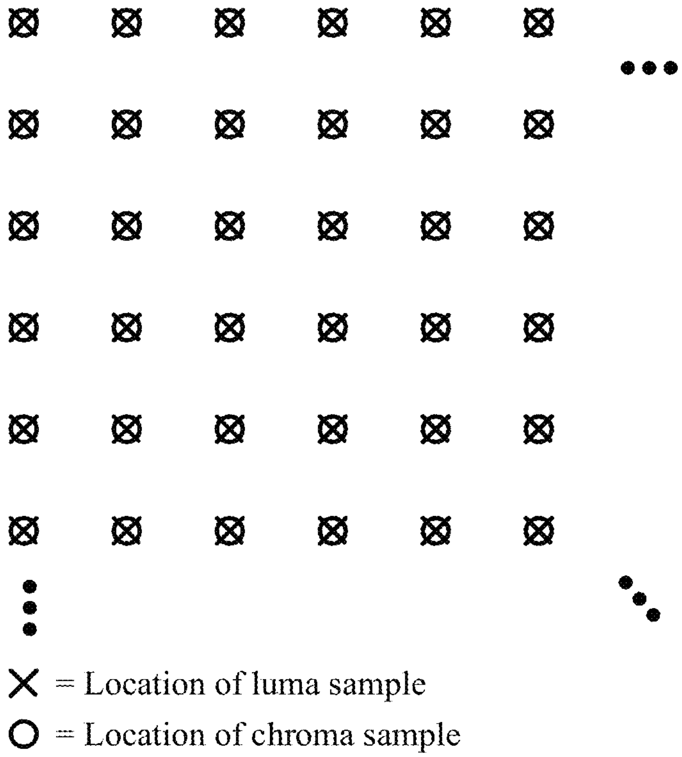
FIG. 6C is a diagram illustrating nominal vertical and horizontal locations of 4:2:2 luma samples and chroma samples in accordance with some examples of the present disclosure.

When the value of sps_chroma_format_idc is equal to 3, all array samples are co-sited for all cases of pictures and the nominal locations in a picture are as shown in FIG. 6C.

Moreover, in VVC, two syntax elements are used to indicate the chroma sampling position relative to luma samples as illustrated below.

sps_chroma_horizontal_collocated_flag equal to 1 specifies that prediction processes operate in a manner designed for chroma sample positions that are not horizontally shifted relative to corresponding luma sample positions. sps_chroma_horizontal_collocated_flag equal to 0 specifies that prediction processes operate in a manner designed for chroma sample positions that are shifted to the right by 0.5 in units of luma samples relative to corresponding luma sample positions. When sps_chroma_horizontal_collocated_flag is not present, it is inferred to be equal to 1.

sps_chroma_vertical_collocated_flag equal to 1 specifies that prediction processes operate in a manner designed for chroma sample positions that are not vertically shifted relative to corresponding luma sample positions. sps_chroma_vertical_collocated_flag equal to 0 specifies that prediction processes operate in a manner designed for chroma sample positions that are shifted downward by 0.5 in units of luma samples relative to corresponding luma sample positions. When sps_chroma_vertical_collocated_flag is not present, it is inferred to be equal to 1.

Figure 3A:
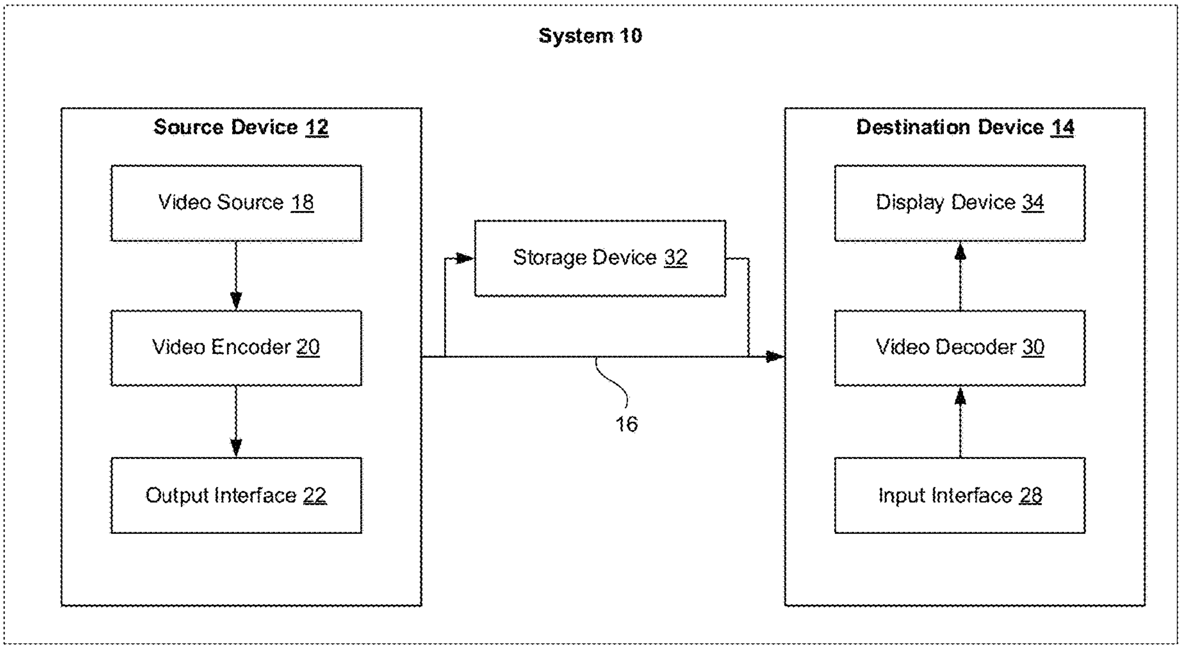
FIG. 3A is a block diagram illustrating a system for encoding and decoding video blocks in accordance with some examples of the present disclosure.

FIG. 3A is a block diagram illustrating an exemplary system 10 for encoding and decoding video blocks in parallel in accordance with some implementations of the present disclosure. As shown in FIG. 3A, the system 10 includes a source device 12 that generates and encodes video data to be decoded at a later time by a destination device 14. The source device 12 and the destination device 14 may comprise any of a wide variety of electronic devices, including desktop or laptop computers, tablet computers, smart phones, set-top boxes, digital televisions, cameras, display devices, digital media players, video gaming consoles, video streaming device, or the like. In some implementations, the source device 12 and the destination device 14 are equipped with wireless communication capabilities.

In some implementations, the destination device 14 may receive the encoded video data to be decoded via a link 16. The link 16 may comprise any type of communication medium or device capable of moving the encoded video data from the source device 12 to the destination device 14. In one example, the link 16 may comprise a communication medium to enable the source device 12 to transmit the encoded video data directly to the destination device 14 in real time. The encoded video data may be modulated according to a communication standard, such as a wireless communication protocol, and transmitted to the destination device 14. The communication medium may comprise any wireless or wired communication medium, such as a Radio Frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In some other implementations, the encoded video data may be transmitted from an output interface 22 to a storage device 32. Subsequently, the encoded video data in the storage device 32 may be accessed by the destination device 14 via an input interface 28. The storage device 32 may include any of a variety of distributed or locally accessed data storage media such as a hard drive, Blu-ray discs, Digital Versatile Disks (DVDs), Compact Disc Read-Only Memories (CD-ROMs), flash memory, volatile or non-volatile memory, or any other suitable digital storage media for storing the encoded video data. In a further example, the storage device 32 may correspond to a file server or another intermediate storage device that may hold the encoded video data generated by the source device 12. The destination device 14 may access the stored video data from the storage device 32 via streaming or downloading. The file server may be any type of computer capable of storing the encoded video data and transmitting the encoded video data to the destination device 14. Exemplary file servers include a web server (e.g., for a website), a File Transfer Protocol (FTP) server, Network Attached Storage (NAS) devices, or a local disk drive. The destination device 14 may access the encoded video data through any standard data connection, including a wireless channel (e.g., a Wireless Fidelity (Wi-Fi) connection), a wired connection (e.g., Digital Subscriber Line (DSL), cable modem, etc.), or a combination of both that is suitable for accessing encoded video data stored on a file server. The transmission of the encoded video data from the storage device 32 may be a streaming transmission, a download transmission, or a combination of both.

As shown in FIG. 3A, the source device 12 includes a video source 18, a video encoder 20 and the output interface 22. The video source 18 may include a source such as a video capturing device, e.g., a video camera, a video archive containing previously captured video, a video feeding interface to receive video from a video content provider, and/or a computer graphics system for generating computer graphics data as the source video, or a combination of such sources. As one example, if the video source 18 is a video camera of a security surveillance system, the source device 12 and the destination device 14 may form camera phones or video phones. However, the implementations described in the present application may be applicable to video coding in general, and may be applied to wireless and/or wired applications.

The captured, pre-captured, or computer-generated video may be encoded by the video encoder 20. The encoded video data may be transmitted directly to the destination device 14 via the output interface 22 of the source device 12. The encoded video data may also (or alternatively) be stored onto the storage device 32 for later access by the destination device 14 or other devices, for decoding and/or playback. The output interface 22 may further include a modem and/or a transmitter.

The destination device 14 includes the input interface 28, a video decoder 30, and a display device 34. The input interface 28 may include a receiver and/or a modem and receive the encoded video data over the link 16. The encoded video data communicated over the link 16, or provided on the storage device 32, may include a variety of syntax elements generated by the video encoder 20 for use by the video decoder 30 in decoding the video data. Such syntax elements may be included within the encoded video data transmitted on a communication medium, stored on a storage medium, or stored on a file server.

In some implementations, the destination device 14 may include the display device 34, which can be an integrated display device and an external display device that is configured to communicate with the destination device 14. The display device 34 displays the decoded video data to a user, and may comprise any of a variety of display devices such as a Liquid Crystal Display (LCD), a plasma display, an Organic Light Emitting Diode (OLED) display, or another type of display device.

The video encoder 20 and the video decoder 30 may operate according to proprietary or industry standards, such as VVC, HEVC, MPEG-4, Part 10, AVC, or extensions of such standards. The present application is not limited to a specific video encoding/decoding standard and may be applicable to other video encoding/decoding standards. It is generally contemplated that the video encoder 20 of the source device 12 may be configured to encode video data according to any of these current or future standards. Similarly, it is also generally contemplated that the video decoder 30 of the destination device 14 may be configured to decode video data according to any of these current or future standards.

The video encoder 20 and the video decoder 30 each may be implemented as any of a variety of suitable encoder and/or decoder circuitry, such as one or more microprocessors, Digital Signal Processors (DSPs), Application Specific Integrated Circuits (ASICs), Field Programmable Gate Arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video encoding/decoding operations disclosed in the present disclosure. Each of the video encoder 20 and the video decoder 30 may be included in one or more encoders or decoders, either of which may be integrated as part of a combined encoder/decoder (CODEC) in a respective device.

Figure 3B:
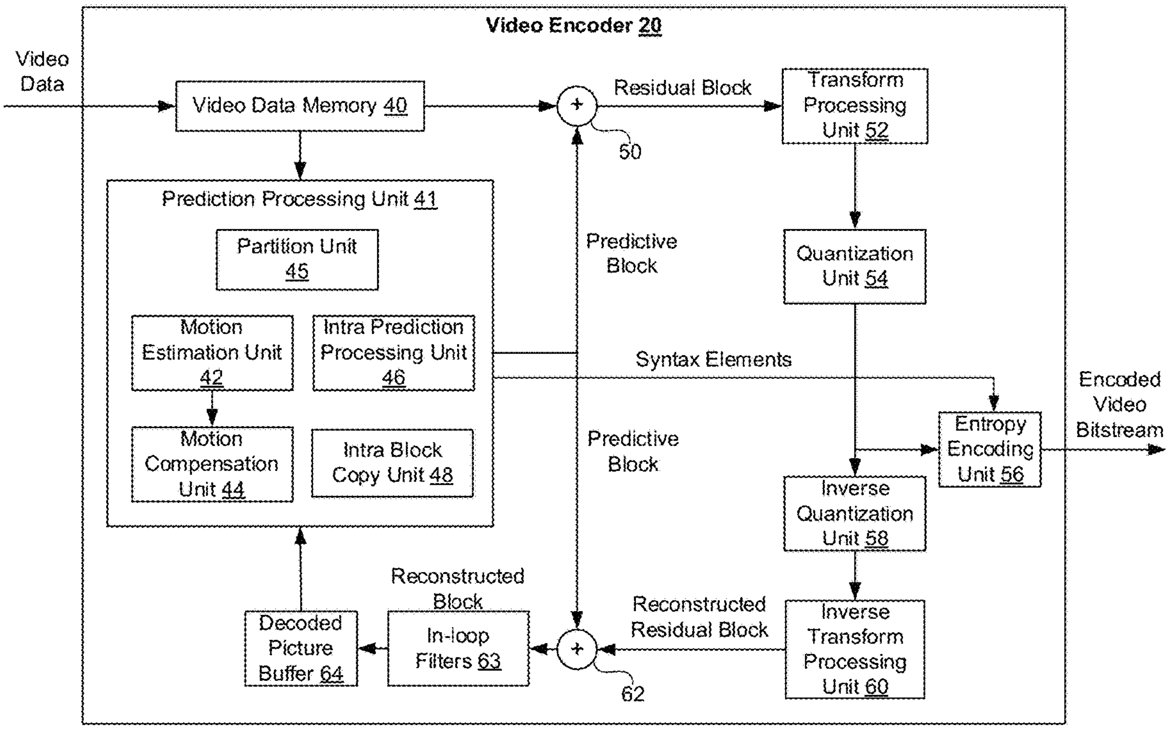
FIG. 3B is a block diagram illustrating an exemplary video encoder in accordance with some examples of the present disclosure.

FIG. 3B is a block diagram illustrating an exemplary video encoder 20 in accordance with some implementations described in the present application. The video encoder 20 may perform intra and inter predictive coding of video blocks within video frames. Intra predictive coding relies on spatial prediction to reduce or remove spatial redundancy in video data within a given video frame or picture. Inter predictive coding relies on temporal prediction to reduce or remove temporal redundancy in video data within adjacent video frames or pictures of a video sequence. It should be noted that the term "frame" may be used as synonyms for the term "image" or "picture" in the field of video coding.

As shown in FIG. 3B, the video encoder 20 includes a video data memory 40, a prediction processing unit 41, a Decoded Picture Buffer (DPB) 64, a summer 50, a transform processing unit 52, a quantization unit 54, and an entropy encoding unit 56. The prediction processing unit 41 further includes a motion estimation unit 42, a motion compensation unit 44, a partition unit 45, an intra prediction processing unit 46, and an intra Block Copy (BC) unit 48. In some implementations, the video encoder 20 also includes an inverse quantization unit 58, an inverse transform processing unit 60, and a summer 62 for video block reconstruction. An in-loop filter 63, such as a deblocking filter, may be positioned between the summer 62 and the DPB 64 to filter block boundaries to remove blockiness artifacts from reconstructed video. Another in-loop filter, such as Sample Adaptive Offset (SAO) filter and/or Adaptive in-Loop Filter (ALF), may also be used in addition to the deblocking filter to filter an output of the summer 62. In some examples, the in-loop filters may be omitted, and the decoded video block may be directly provided by the summer 62 to the DPB 64. The video encoder 20 may take the form of a fixed or programmable hardware unit or may be divided among one or more of the illustrated fixed or programmable hardware units.

The video data memory 40 may store video data to be encoded by the components of the video encoder 20. The video data in the video data memory 40 may be obtained, for example, from the video source 18 as shown in FIG. 3A. The DPB 64 is a buffer that stores reference video data (for example, reference frames or pictures) for use in encoding video data by the video encoder 20 (e.g., in intra or inter predictive coding modes). The video data memory 40 and the DPB 64 may be formed by any of a variety of memory devices. In various examples, the video data memory 40 may be on-chip with other components of the video encoder 20, or off-chip relative to those components.

As shown in FIG. 3B, after receiving the video data, the partition unit 45 within the prediction processing unit 41 partitions the video data into video blocks. This partitioning may also include partitioning a video frame into slices, tiles (for example, sets of video blocks), or other larger Coding Units (CUs) according to predefined splitting structures such as a Quad-Tree (QT) structure associated with the video data. The video frame is or may be regarded as a two-dimensional array or matrix of samples with sample values. A sample in the array may also be referred to as a pixel or a pel. A number of samples in horizontal and vertical directions (or axes) of the array or picture define a size and/or a resolution of the video frame. The video frame may be divided into multiple video blocks by, for example, using QT partitioning. The video block again is or may be regarded as a two-dimensional array or matrix of samples with sample values, although of smaller dimension than the video frame. A number of samples in horizontal and vertical directions (or axes) of the video block define a size of the video block. The video block may further be partitioned into one or more block partitions or sub-blocks (which may form again blocks) by, for example, iteratively using QT partitioning, Binary-Tree (BT) partitioning or Triple-Tree (TT) partitioning or any combination thereof. It should be noted that the term "block" or "video block" as used herein may be a portion, in particular a rectangular (square or non-square) portion, of a frame or a picture. With reference, for example, to HEVC and VVC, the block or video block may be or correspond to a Coding Tree Unit (CTU), a CU, a Prediction Unit (PU) or a Transform Unit (TU) and/or may be or correspond to a corresponding block, e.g. a Coding Tree Block (CTB), a Coding Block (CB), a Prediction Block (PB) or a Transform Block (TB) and/or to a sub-block.

The prediction processing unit 41 may select one of a plurality of possible predictive coding modes, such as one of a plurality of intra predictive coding modes or one of a plurality of inter predictive coding modes, for the current video block based on error results (e.g., coding rate and the level of distortion). The prediction processing unit 41 may provide the resulting intra or inter prediction coded block to the summer 50 to generate a residual block and to the summer 62 to reconstruct the encoded block for use as part of a reference frame subsequently. The prediction processing unit 41 also provides syntax elements, such as motion vectors, intra-mode indicators, partition information, and other such syntax information, to the entropy encoding unit 56.

In order to select an appropriate intra predictive coding mode for the current video block, the intra prediction processing unit 46 within the prediction processing unit 41 may perform intra predictive coding of the current video block relative to one or more neighbor blocks in the same frame as the current block to be coded to provide spatial prediction. The motion estimation unit 42 and the motion compensation unit 44 within the prediction processing unit 41 perform inter predictive coding of the current video block relative to one or more predictive blocks in one or more reference frames to provide temporal prediction. The video encoder 20 may perform multiple coding passes, e.g., to select an appropriate coding mode for each block of video data.

In some implementations, the motion estimation unit 42 determines the inter prediction mode for a current video frame by generating a motion vector, which indicates the displacement of a video block within the current video frame relative to a predictive block within a reference video frame, according to a predetermined pattern within a sequence of video frames. Motion estimation, performed by the motion estimation unit 42, is the process of generating motion vectors, which estimate motion for video blocks. A motion vector, for example, may indicate the displacement of a video block within a current video frame or picture relative to a predictive block within a reference frame relative to the current block being coded within the current frame. The predetermined pattern may designate video frames in the sequence as P frames or B frames. The intra BC unit 48 may determine vectors, e.g., block vectors, for intra BC coding in a manner similar to the determination of motion vectors by the motion estimation unit 42 for inter prediction, or may utilize the motion estimation unit 42 to determine the block vector.

A predictive block for the video block may be or may correspond to a block or a reference block of a reference frame that is deemed as closely matching the video block to be coded in terms of pixel difference, which may be determined by Sum of Absolute Difference (SAD), Sum of Square Difference (SSD), or other difference metrics. In some implementations, the video encoder 20 may calculate values for sub-integer pixel positions of reference frames stored in the DPB 64. For example, the video encoder 20 may interpolate values of one-quarter pixel positions, one-eighth pixel positions, or other fractional pixel positions of the reference frame. Therefore, the motion estimation unit 42 may perform a motion search relative to the full pixel positions and fractional pixel positions and output a motion vector with fractional pixel precision.

The motion estimation unit 42 calculates a motion vector for a video block in an inter prediction coded frame by comparing the position of the video block to the position of a predictive block of a reference frame selected from a first reference frame list (List 0) or a second reference frame list (List 1), each of which identifies one or more reference frames stored in the DPB 64. The motion estimation unit 42 sends the calculated motion vector to the motion compensation unit 44 and then to the entropy encoding unit 56.

Motion compensation, performed by the motion compensation unit 44, may involve fetching or generating the predictive block based on the motion vector determined by the motion estimation unit 42. Upon receiving the motion vector for the current video block, the motion compensation unit 44 may locate a predictive block to which the motion vector points in one of the reference frame lists, retrieve the predictive block from the DPB 64, and forward the predictive block to the summer 50. The summer 50 then forms a residual video block of pixel difference values by subtracting pixel values of the predictive block provided by the motion compensation unit 44 from the pixel values of the current video block being coded. The pixel difference values forming the residual video block may include luma or chroma difference components or both. The motion compensation unit 44 may also generate syntax elements associated with the video blocks of a video frame for use by the video decoder 30 in decoding the video blocks of the video frame. The syntax elements may include, for example, syntax elements defining the motion vector used to identify the predictive block, any flags indicating the prediction mode, or any other syntax information described herein. Note that the motion estimation unit 42 and the motion compensation unit 44 may be highly integrated, but are illustrated separately for conceptual purposes.

In some implementations, the intra BC unit 48 may generate vectors and fetch predictive blocks in a manner similar to that described above in connection with the motion estimation unit 42 and the motion compensation unit 44, but with the predictive blocks being in the same frame as the current block being coded and with the vectors being referred to as block vectors as opposed to motion vectors. In particular, the intra BC unit 48 may determine an intra-prediction mode to use to encode a current block. In some examples, the intra BC unit 48 may encode a current block using various intra-prediction modes, e.g., during separate encoding passes, and test their performance through rate-distortion analysis. Next, the intra BC unit 48 may select, among the various tested intra-prediction modes, an appropriate intra-prediction mode to use and generate an intra-mode indicator accordingly. For example, the intra BC unit 48 may calculate rate-distortion values using a rate-distortion analysis for the various tested intra-prediction modes, and select the intra-prediction mode having the best rate-distortion characteristics among the tested modes as the appropriate intra-prediction mode to use. Rate-distortion analysis generally determines an amount of distortion (or error) between an encoded block and an original, unencoded block that was encoded to produce the encoded block, as well as a bitrate (i.e., a number of bits) used to produce the encoded block. Intra BC unit 48 may calculate ratios from the distortions and rates for the various encoded blocks to determine which intra-prediction mode exhibits the best rate-distortion value for the block.

In other examples, the intra BC unit 48 may use the motion estimation unit 42 and the motion compensation unit 44, in whole or in part, to perform such functions for Intra BC prediction according to the implementations described herein. In either case, for Intra block copy, a predictive block may be a block that is deemed as closely matching the block to be coded, in terms of pixel difference, which may be determined by SAD, SSD, or other difference metrics, and identification of the predictive block may include calculation of values for sub-integer pixel positions.

Whether the predictive block is from the same frame according to intra prediction, or a different frame according to inter prediction, the video encoder 20 may form a residual video block by subtracting pixel values of the predictive block from the pixel values of the current video block being coded, forming pixel difference values. The pixel difference values forming the residual video block may include both luma component differences and chroma component differences.

The intra prediction processing unit 46 may intra-predict a current video block, as an alternative to the inter-prediction performed by the motion estimation unit 42 and the motion compensation unit 44, or the intra block copy prediction performed by the intra BC unit 48, as described above. In particular, the intra prediction processing unit 46 may determine an intra prediction mode to use to encode a current block. To do so, the intra prediction processing unit 46 may encode a current block using various intra prediction modes, e.g., during separate encoding passes, and the intra prediction processing unit 46 (or a mode selection unit, in some examples) may select an appropriate intra prediction mode to use from the tested intra prediction modes. The intra prediction processing unit 46 may provide information indicative of the selected intra-prediction mode for the block to the entropy encoding unit 56. The entropy encoding unit 56 may encode the information indicating the selected intra-prediction mode in the bitstream.

After the prediction processing unit 41 determines the predictive block for the current video block via either inter prediction or intra prediction, the summer 50 forms a residual video block by subtracting the predictive block from the current video block. The residual video data in the residual block may be included in one or more TUs and is provided to the transform processing unit 52. The transform processing unit 52 transforms the residual video data into residual transform coefficients using a transform, such as a Discrete Cosine Transform (DCT) or a conceptually similar transform.

The transform processing unit 52 may send the resulting transform coefficients to the quantization unit 54. The quantization unit 54 quantizes the transform coefficients to further reduce the bit rate. The quantization process may also reduce the bit depth associated with some or all of the coefficients. The degree of quantization may be modified by adjusting a quantization parameter. In some examples, the quantization unit 54 may then perform a scan of a matrix including the quantized transform coefficients. Alternatively, the entropy encoding unit 56 may perform the scan.

Following quantization, the entropy encoding unit 56 entropy encodes the quantized transform coefficients into a video bitstream using, e.g., Context Adaptive Variable Length Coding (CAVLC), Context Adaptive Binary Arithmetic Coding (CABAC), Syntax-based context-adaptive Binary Arithmetic Coding (SBAC), Probability Interval Partitioning Entropy (PIPE) coding or another entropy encoding methodology or technique. The encoded bitstream may then be transmitted to the video decoder 30 as shown in FIG. 3A, or archived in the storage device 32 as shown in FIG. 3A for later transmission to or retrieval by the video decoder 30. The entropy encoding unit 56 may also entropy encode the motion vectors and the other syntax elements for the current video frame being coded.

The inverse quantization unit 58 and the inverse transform processing unit 60 apply inverse quantization and inverse transformation, respectively, to reconstruct the residual video block in the pixel domain for generating a reference block for prediction of other video blocks. As noted above, the motion compensation unit 44 may generate a motion compensated predictive block from one or more reference blocks of the frames stored in the DPB 64. The motion compensation unit 44 may also apply one or more interpolation filters to the predictive block to calculate sub-integer pixel values for use in motion estimation.

The summer 62 adds the reconstructed residual block to the motion compensated predictive block produced by the motion compensation unit 44 to produce a reference block for storage in the DPB 64. The reference block may then be used by the intra BC unit 48, the motion estimation unit 42 and the motion compensation unit 44 as a predictive block to inter predict another video block in a subsequent video frame.

Figure 3C:
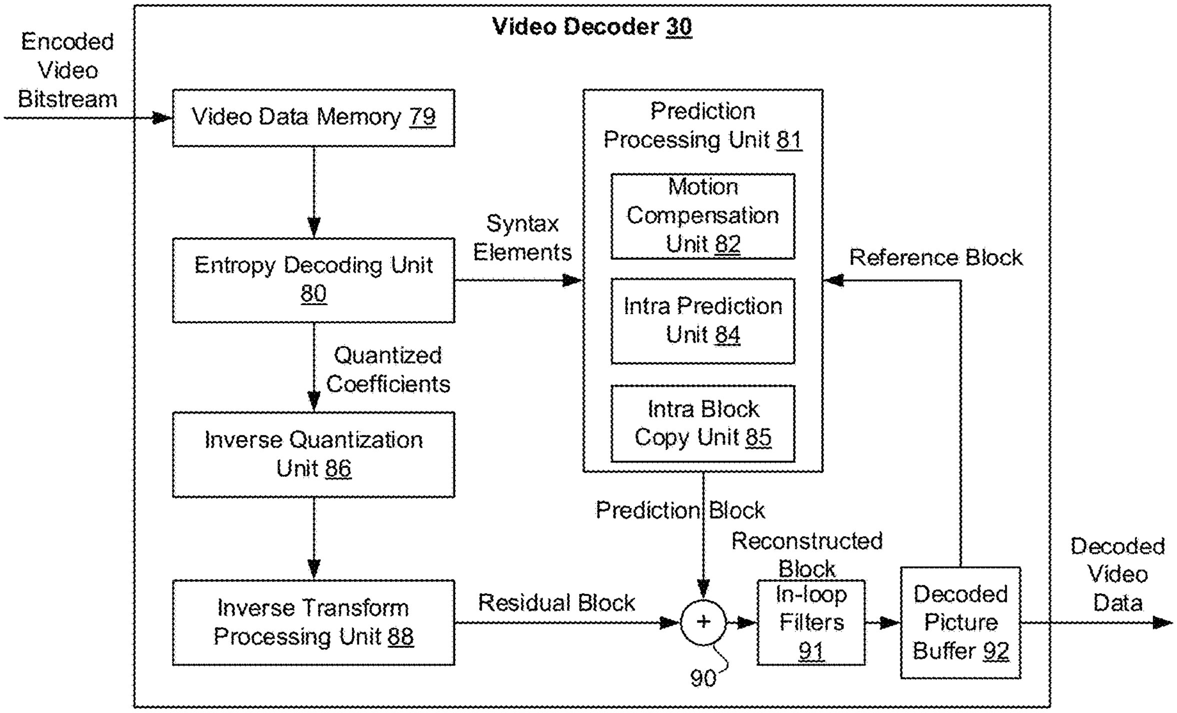
FIG. 3C is a block diagram illustrating an exemplary video decoder in accordance with some examples of the present disclosure.

FIG. 3C is a block diagram illustrating an exemplary video decoder 30 in accordance with some implementations of the present application. The video decoder 30 includes a video data memory 79, an entropy decoding unit 80, a prediction processing unit 81, an inverse quantization unit 86, an inverse transform processing unit 88, a summer 90, and a DPB 92. The prediction processing unit 81 further includes a motion compensation unit 82, an intra prediction unit 84, and an intra BC unit 85. The video decoder 30 may perform a decoding process generally reciprocal to the encoding process described above with respect to the video encoder 20 in connection with FIG. 3B. For example, the motion compensation unit 82 may generate prediction data based on motion vectors received from the entropy decoding unit 80, while the intra-prediction unit 84 may generate prediction data based on intra-prediction mode indicators received from the entropy decoding unit 80.

In some examples, a unit of the video decoder 30 may be tasked to perform the implementations of the present application. Also, in some examples, the implementations of the present disclosure may be divided among one or more of the units of the video decoder 30. For example, the intra BC unit 85 may perform the implementations of the present application, alone, or in combination with other units of the video decoder 30, such as the motion compensation unit 82, the intra prediction unit 84, and the entropy decoding unit 80. In some examples, the video decoder 30 may not include the intra BC unit 85 and the functionality of intra BC unit 85 may be performed by other components of the prediction processing unit 81, such as the motion compensation unit 82.

The video data memory 79 may store video data, such as an encoded video bitstream, to be decoded by the other components of the video decoder 30. The video data stored in the video data memory 79 may be obtained, for example, from the storage device 32, from a local video source, such as a camera, via wired or wireless network communication of video data, or by accessing physical data storage media (e.g., a flash drive or hard disk). The video data memory 79 may include a Coded Picture Buffer (CPB) that stores encoded video data from an encoded video bitstream. The DPB 92 of the video decoder 30 stores reference video data for use in decoding video data by the video decoder 30 (e.g., in intra or inter predictive coding modes). The video data memory 79 and the DPB 92 may be formed by any of a variety of memory devices, such as dynamic random access memory (DRAM), including Synchronous DRAM (SDRAM), Magneto-resistive RAM (MRAM), Resistive RAM (RRAM), or other types of memory devices. For illustrative purpose, the video data memory 79 and the DPB 92 are depicted as two distinct components of the video decoder 30 in FIG. 3C. In some embodiments, the video data memory 79 and the DPB 92 may be provided by the same memory device or separate memory devices. In some examples, the video data memory 79 may be on-chip with other components of the video decoder 30, or off-chip relative to those components.

During the decoding process, the video decoder 30 receives an encoded video bitstream that represents video blocks of an encoded video frame and associated syntax elements. The video decoder 30 may receive the syntax elements at the video frame level and/or the video block level. The entropy decoding unit 80 of the video decoder 30 entropy decodes the bitstream to generate quantized coefficients, motion vectors or intra-prediction mode indicators, and other syntax elements. The entropy decoding unit 80 then forwards the motion vectors or intra-prediction mode indicators and other syntax elements to the prediction processing unit 81.

When the video frame is coded as an intra predictive coded (I) frame or for intra coded predictive blocks in other types of frames, the intra prediction unit 84 of the prediction processing unit 81 may generate prediction data for a video block of the current video frame based on a signaled intra prediction mode and reference data from previously decoded blocks of the current frame.

When the video frame is coded as an inter-predictive coded (i.e., B or P) frame, the motion compensation unit 82 of the prediction processing unit 81 produces one or more predictive blocks for a video block of the current video frame based on the motion vectors and other syntax elements received from the entropy decoding unit 80. Each of the predictive blocks may be produced from a reference frame within one of the reference frame lists. The video decoder 30 may construct the reference frame lists, List 0 and List 1, using default construction techniques based on reference frames stored in the DPB 92.

In some examples, when the video block is coded according to the intra BC mode described herein, the intra BC unit 85 of the prediction processing unit 81 produces predictive blocks for the current video block based on block vectors and other syntax elements received from the entropy decoding unit 80. The predictive blocks may be within a reconstructed region of the same picture as the current video block defined by the video encoder 20.

The motion compensation unit 82 and/or the intra BC unit 85 determines prediction information for a video block of the current video frame by parsing the motion vectors and other syntax elements, and then uses the prediction information to produce the predictive blocks for the current video block being decoded. For example, the motion compensation unit 82 uses some of the received syntax elements to determine a prediction mode (e.g., intra or inter prediction) used to code video blocks of the video frame, an inter prediction frame type (e.g., B or P), construction information for one or more of the reference frame lists for the frame, motion vectors for each inter predictive encoded video block of the frame, inter prediction status for each inter predictive coded video block of the frame, and other information to decode the video blocks in the current video frame.

Similarly, the intra BC unit 85 may use some of the received syntax elements, e.g., a flag, to determine that the current video block was predicted using the intra BC mode, construction information of which video blocks of the frame are within the reconstructed region and should be stored in the DPB 92, block vectors for each intra BC predicted video block of the frame, intra BC prediction status for each intra BC predicted video block of the frame, and other information to decode the video blocks in the current video frame.

The motion compensation unit 82 may also perform interpolation using the interpolation filters as used by the video encoder 20 during encoding of the video blocks to calculate interpolated values for sub-integer pixels of reference blocks. In this case, the motion compensation unit 82 may determine the interpolation filters used by the video encoder 20 from the received syntax elements and use the interpolation filters to produce predictive blocks.

The inverse quantization unit 86 inverse quantizes the quantized transform coefficients provided in the bitstream and entropy decoded by the entropy decoding unit 80 using the same quantization parameter calculated by the video encoder 20 for each video block in the video frame to determine a degree of quantization. The inverse transform processing unit 88 applies an inverse transform, e.g., an inverse DCT, an inverse integer transform, or a conceptually similar inverse transform process, to the transform coefficients in order to reconstruct the residual blocks in the pixel domain.

After the motion compensation unit 82 or the intra BC unit 85 generates the predictive block for the current video block based on the vectors and other syntax elements, the summer 90 reconstructs decoded video block for the current video block by summing the residual block from the inverse transform processing unit 88 and a corresponding predictive block generated by the motion compensation unit 82 and the intra BC unit 85. An in-loop filter 91 such as deblocking filter, SAO filter and/or ALF may be positioned between the summer 90 and the DPB 92 to further process the decoded video block. In some examples, the in-loop filter 91 may be omitted, and the decoded video block may be directly provided by the summer 90 to the DPB 92. The decoded video blocks in a given frame are then stored in the DPB 92, which stores reference frames used for subsequent motion compensation of next video blocks. The DPB 92, or a memory device separate from the DPB 92, may also store decoded video for later presentation on a display device, such as the display device 34 of FIG. 3A.

In a typical video coding process, a video sequence typically includes an ordered set of frames or pictures. Each frame may include three sample arrays, denoted SL, SCb, and SCr. SL is a two-dimensional array of luma samples. SCb is a two-dimensional array of Cb chroma samples. SCr is a two-dimensional array of Cr chroma samples. In other instances, a frame may be monochrome and therefore includes only one two-dimensional array of luma samples.

Figure 4A:
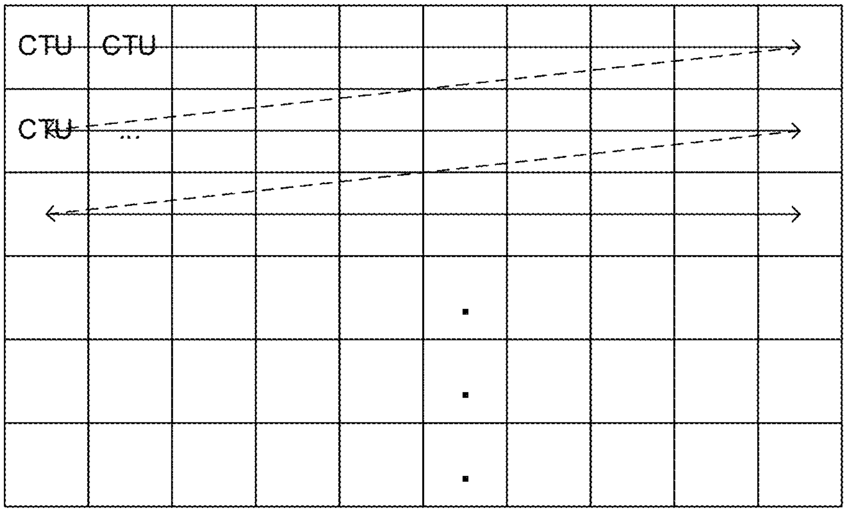
FIGS. 4A, 4B, 4C and 4D are block diagrams illustrating how a frame is recursively partitioned into multiple video blocks of different sizes and shapes in accordance with some examples of the present disclosure.
Figure 4B:
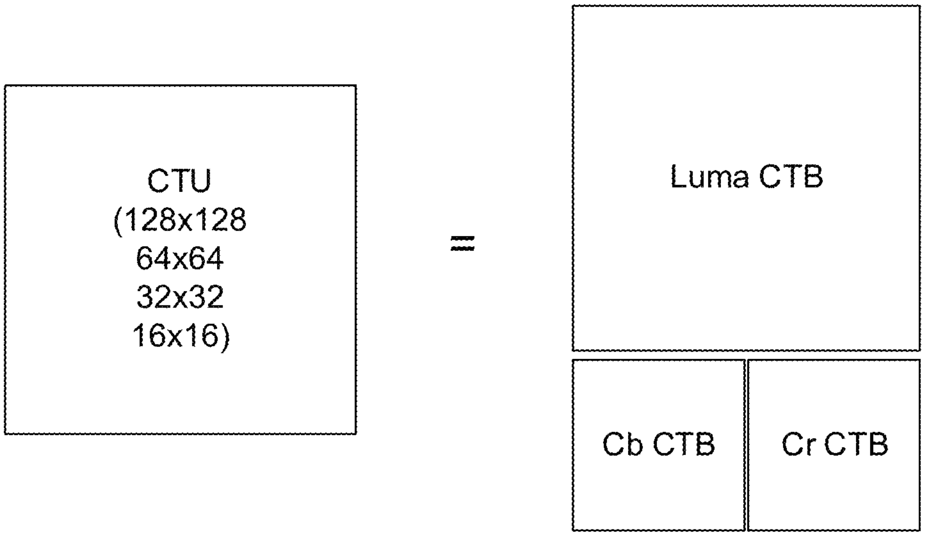

As shown in FIG. 4A, the video encoder 20 (or more specifically the partition unit 45) generates an encoded representation of a frame by first partitioning the frame into a set of CTUs. A video frame may include an integer number of CTUs ordered consecutively in a raster scan order from left to right and from top to bottom. Each CTU is a largest logical coding unit and the width and height of the CTU are signaled by the video encoder 20 in a sequence parameter set, such that all the CTUs in a video sequence have the same size being one of 128×128, 64×64, 32×32, and 16×16. But it should be noted that the present application is not necessarily limited to a particular size. As shown in FIG. 4B, each CTU may comprise one CTB of luma samples, two corresponding coding tree blocks of chroma samples, and syntax elements used to code the samples of the coding tree blocks. The syntax elements describe properties of different types of units of a coded block of pixels and how the video sequence can be reconstructed at the video decoder 30, including inter or intra prediction, intra prediction mode, motion vectors, and other parameters. In monochrome pictures or pictures having three separate color planes, a CTU may comprise a single coding tree block and syntax elements used to code the samples of the coding tree block. A coding tree block may be an N×N block of samples.

Figure 4C:
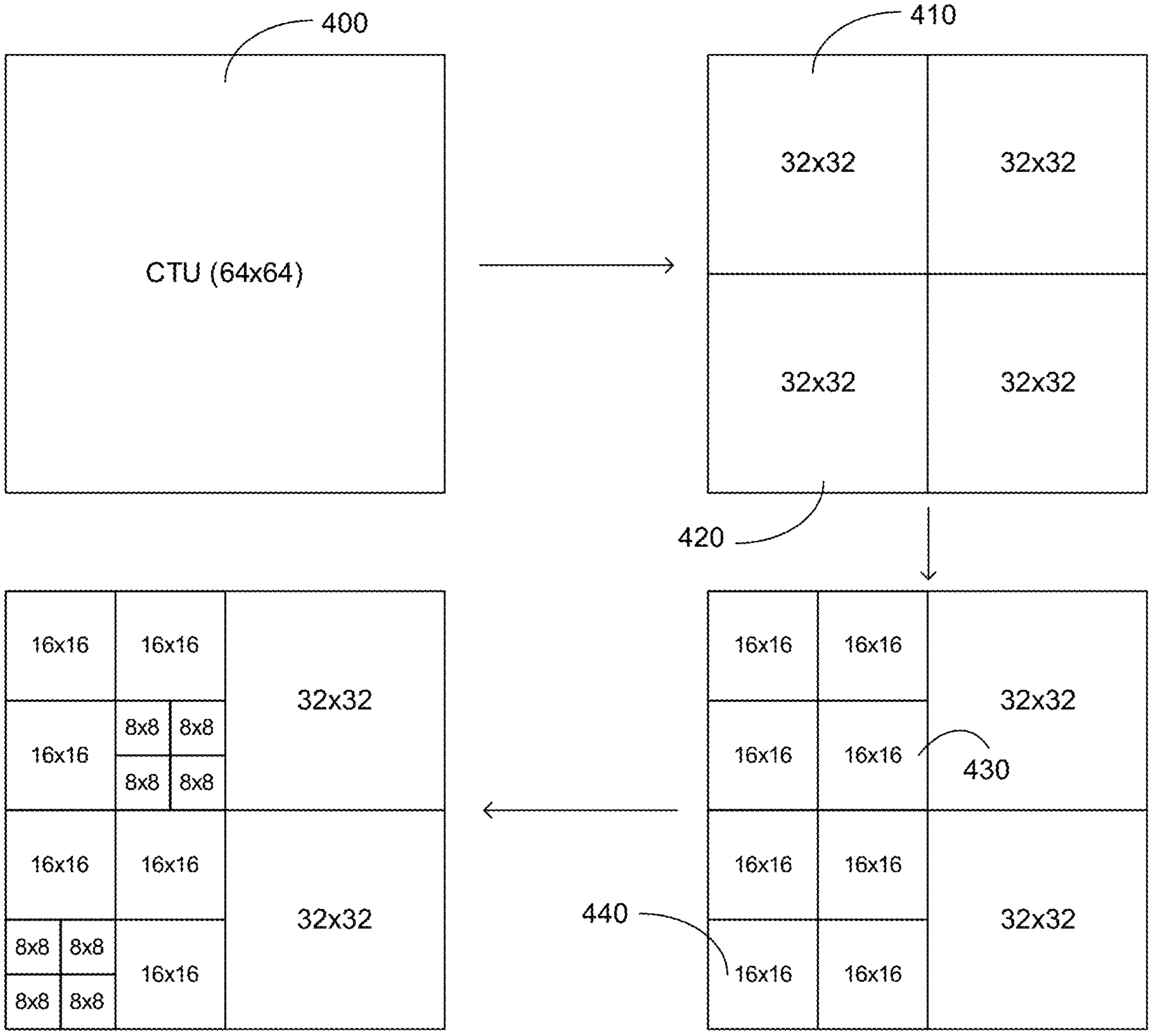
Figure 4D:
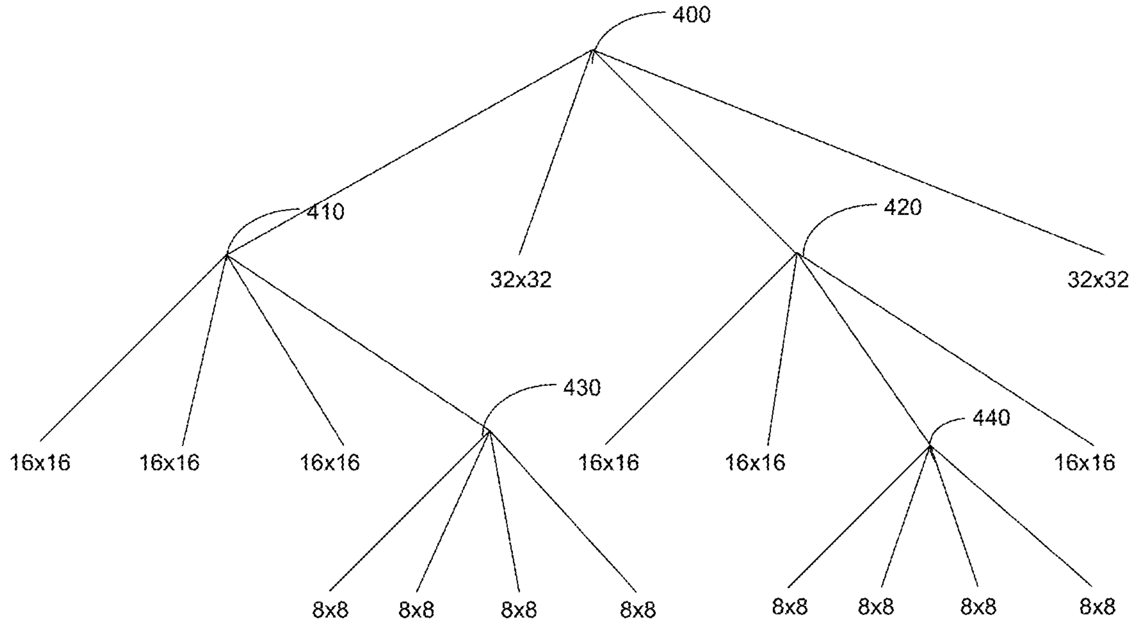
Figure 5:
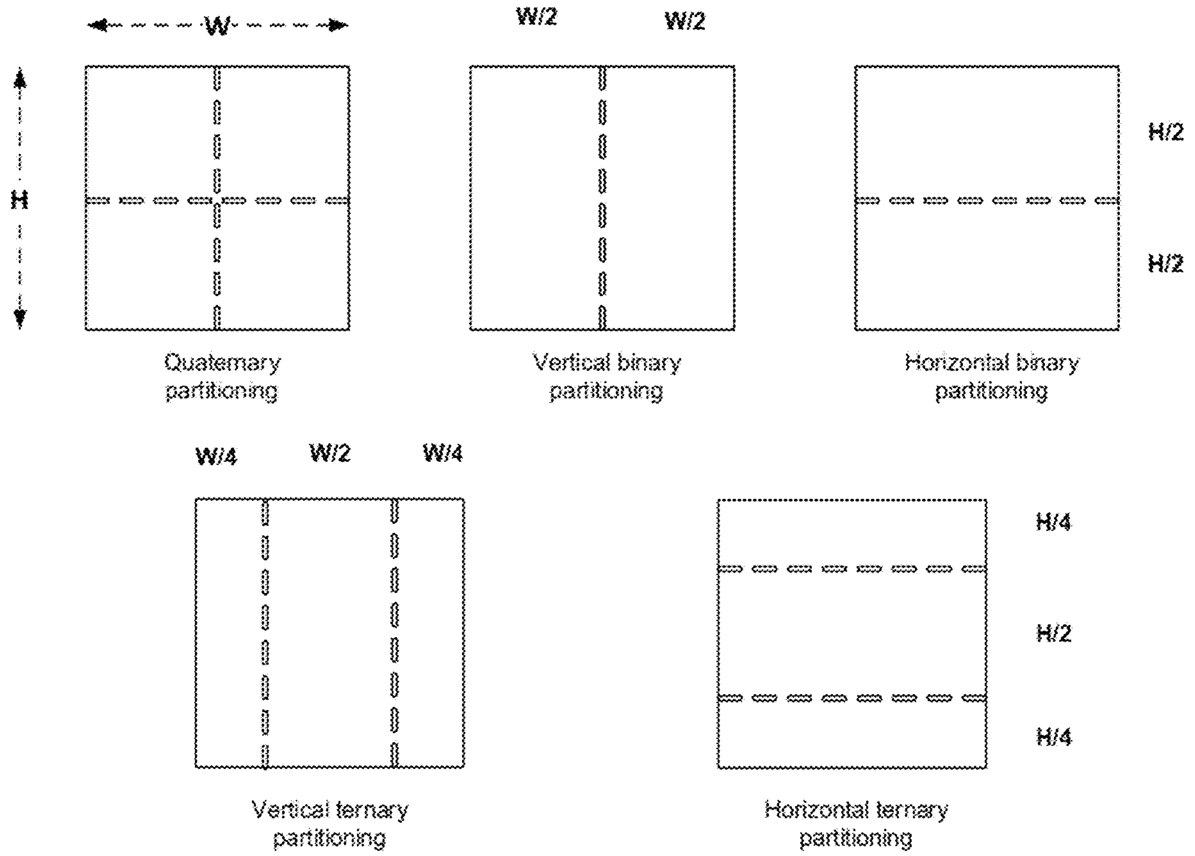
FIG. 5 illustrates partitioning types of a coding block having a width W and a height H in accordance with some examples of the present disclosure.

To achieve a better performance, the video encoder 20 may recursively perform tree partitioning such as binary-tree partitioning, ternary-tree partitioning, quad-tree partitioning or a combination thereof on the coding tree blocks of the CTU and divide the CTU into smaller CUs. As depicted in FIG. 4C, the 64×64 CTU 400 is first divided into four smaller CUs, each having a block size of 32×32. Among the four smaller CUs, CU 410 and CU 420 are each divided into four CUs of 16×16 by block size. The two 16×16 CUs 430 and 440 are each further divided into four CUs of 8×8 by block size. FIG. 4D depicts a quad-tree data structure illustrating the end result of the partition process of the CTU 400 as depicted in FIG. 4C, each leaf node of the quad-tree corresponding to one CU of a respective size ranging from 32×32 to 8×8. Like the CTU depicted in FIG. 4B, each CU may comprise a CB of luma samples and two corresponding coding blocks of chroma samples of a frame of the same size, and syntax elements used to code the samples of the coding blocks. In monochrome pictures or pictures having three separate color planes, a CU may comprise a single coding block and syntax structures used to code the samples of the coding block. It should be noted that the quad-tree partitioning depicted in FIGS. 4C and 4D is only for illustrative purposes and one CTU can be split into CUs to adapt to varying local characteristics based on quad/ternary/binary-tree partitions. In the multi-type tree structure, one CTU is partitioned by a quad-tree structure and each quad-tree leaf CU can be further partitioned by a binary and ternary tree structure. FIG. 5 illustrates five possible partitioning types of a coding block having a width W and a height H, i.e., quaternary partitioning, horizontal binary partitioning, vertical binary partitioning, horizontal ternary partitioning, and vertical ternary partitioning.

In some implementations, the video encoder 20 may further partition a coding block of a CU into one or more M×N PBs. A PB is a rectangular (square or non-square) block of samples on which the same prediction, inter or intra, is applied. A PU of a CU may comprise a PB of luma samples, two corresponding PBs of chroma samples, and syntax elements used to predict the PBs. In monochrome pictures or pictures having three separate color planes, a PU may comprise a single PB and syntax structures used to predict the PB. The video encoder 20 may generate predictive luma, Cb, and Cr blocks for luma, Cb, and Cr PBs of each PU of the CU.

The video encoder 20 may use intra prediction or inter prediction to generate the predictive blocks for a PU. If the video encoder 20 uses intra prediction to generate the predictive blocks of a PU, the video encoder 20 may generate the predictive blocks of the PU based on decoded samples of the frame associated with the PU. If the video encoder 20 uses inter prediction to generate the predictive blocks of a PU, the video encoder 20 may generate the predictive blocks of the PU based on decoded samples of one or more frames other than the frame associated with the PU.

After the video encoder 20 generates predictive luma, Cb, and Cr blocks for one or more PUs of a CU, the video encoder 20 may generate a luma residual block for the CU by subtracting the CU's predictive luma blocks from its original luma coding block such that each sample in the CU's luma residual block indicates a difference between a luma sample in one of the CU's predictive luma blocks and a corresponding sample in the CU's original luma coding block. Similarly, the video encoder 20 may generate a Cb residual block and a Cr residual block for the CU, respectively, such that each sample in the CU's Cb residual block indicates a difference between a Cb sample in one of the CU's predictive Cb blocks and a corresponding sample in the CU's original Cb coding block and each sample in the CU's Cr residual block may indicate a difference between a Cr sample in one of the CU's predictive Cr blocks and a corresponding sample in the CU's original Cr coding block.

Furthermore, as illustrated in FIG. 4C, the video encoder 20 may use quad-tree partitioning to decompose the luma, Cb, and Cr residual blocks of a CU into one or more luma, Cb, and Cr transform blocks respectively. A transform block is a rectangular (square or non-square) block of samples on which the same transform is applied. A TU of a CU may comprise a transform block of luma samples, two corresponding transform blocks of chroma samples, and syntax elements used to transform the transform block samples. Thus, each TU of a CU may be associated with a luma transform block, a Cb transform block, and a Cr transform block. In some examples, the luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

The video encoder 20 may apply one or more transforms to a luma transform block of a TU to generate a luma coefficient block for the TU. A coefficient block may be a two-dimensional array of transform coefficients. A transform coefficient may be a scalar quantity. The video encoder 20 may apply one or more transforms to a Cb transform block of a TU to generate a Cb coefficient block for the TU. The video encoder 20 may apply one or more transforms to a Cr transform block of a TU to generate a Cr coefficient block for the TU.

After generating a coefficient block (e.g., a luma coefficient block, a Cb coefficient block or a Cr coefficient block), the video encoder 20 may quantize the coefficient block. Quantization generally refers to a process in which transform coefficients are quantized to possibly reduce the amount of data used to represent the transform coefficients, providing further compression. After the video encoder 20 quantizes a coefficient block, the video encoder 20 may entropy encode syntax elements indicating the quantized transform coefficients. For example, the video encoder 20 may perform CABAC on the syntax elements indicating the quantized transform coefficients. Finally, the video encoder 20 may output a bitstream that includes a sequence of bits that forms a representation of coded frames and associated data, which is either saved in the storage device 32 or transmitted to the destination device 14.

After receiving a bitstream generated by the video encoder 20, the video decoder 30 may parse the bitstream to obtain syntax elements from the bitstream. The video decoder 30 may reconstruct the frames of the video data based at least in part on the syntax elements obtained from the bitstream. The process of reconstructing the video data is generally reciprocal to the encoding process performed by the video encoder 20. For example, the video decoder 30 may perform inverse transforms on the coefficient blocks associated with TUs of a current CU to reconstruct residual blocks associated with the TUs of the current CU. The video decoder 30 also reconstructs the coding blocks of the current CU by adding the samples of the predictive blocks for PUs of the current CU to corresponding samples of the transform blocks of the TUs of the current CU. After reconstructing the coding blocks for each CU of a frame, video decoder 30 may reconstruct the frame.

As noted above, video coding achieves video compression using primarily two modes, i.e., intra-frame prediction (or intra-prediction) and inter-frame prediction (or inter-prediction). It is noted that IBC could be regarded as either intra-frame prediction or a third mode. Between the two modes, inter-frame prediction contributes more to the coding efficiency than intra-frame prediction because of the use of motion vectors for predicting a current video block from a reference video block.

But with the ever improving video data capturing technology and more refined video block size for preserving details in the video data, the amount of data required for representing motion vectors for a current frame also increases substantially. One way of overcoming this challenge is to benefit from the fact that not only a group of neighboring CUs in both the spatial and temporal domains have similar video data for predicting purpose but the motion vectors between these neighboring CUs are also similar. Therefore, it is possible to use the motion information of spatially neighboring CUs and/or temporally co-located CUs as an approximation of the motion information (e.g., motion vector) of a current CU by exploring their spatial and temporal correlation, which is also referred to as "Motion Vector Predictor (MVP)" of the current CU.

Instead of encoding, into the video bitstream, an actual motion vector of the current CU determined by the motion estimation unit 42 as described above in connection with FIG. 3B, the motion vector predictor of the current CU is subtracted from the actual motion vector of the current CU to produce a Motion Vector Difference (MVD) for the current CU. By doing so, there is no need to encode the motion vector determined by the motion estimation unit 42 for each CU of a frame into the video bitstream and the amount of data used for representing motion information in the video bitstream can be significantly decreased.

Like the process of choosing a predictive block in a reference frame during inter-frame prediction of a code block, a set of rules need to be adopted by both the video encoder 20 and the video decoder 30 for constructing a motion vector candidate list (also known as a "merge list") for a current CU using those potential candidate motion vectors associated with spatially neighboring CUs and/or temporally co-located CUs of the current CU and then selecting one member from the motion vector candidate list as a motion vector predictor for the current CU. By doing so, there is no need to transmit the motion vector candidate list itself from the video encoder 20 to the video decoder 30 and an index of the selected motion vector predictor within the motion vector candidate list is sufficient for the video encoder 20 and the video decoder 30 to use the same motion vector predictor within the motion vector candidate list for encoding and decoding the current CU.

In the existing video codec, coding (including encoding and decoding) of a picture follows a predefined order on a basis of predefine coding units. For example, in HEVC, CTUs in one picture (or slice) are coded in raster scan order and the coding units within a CTU are coded using predefined z-order. In the context of the predefined coding order, only the left and above neighboring reconstructed samples could be used for the intra prediction of a coding block.

In this disclosure, several schemes are proposed to apply predefined operations to a picture (or slice) to change the coding order of the samples within a picture or slice. At the encoder, by testing various modified pictures, different coding performance (e.g. BD-rate performance) could be observed, and the one with the best performance could be selected to be adopted. At the decoder, after the modified picture or slice is reconstructed, the selected inverse operations are then applied to the reconstructed picture or slice to be restored back to be original one.

The proposed schemes may be applied independently or in combination.

In the first example, a predefined geometric operation may be applied to the luma samples and/or chroma samples of each picture (or slice) of the input video sequence to be coded. The picture or slice to which the geometric operation is applied is termed modified picture or slice. The modified picture or slice is then used as input picture or slice for the video encoder and the associated metadata for the modified picture is also updated accordingly. For example, the modified picture or slice may have a different width and/or height compared to the original picture or slice. After the modified picture or slice is reconstructed by the decoder, the inverse geometric operation is then applied to restore the modified picture or slice to the original one.

A geometric operation maps pixel information (i.e. the intensity values) at each pixel location (x1, y1) in an input image to another location (x2, y2) in an output image. The geometric operators described in this disclosure include but not limited to the following operations. In this disclosure, the original point is assumed as the top-left sample in one picture or slice. The x index increases from left to right while the y index increases from top to bottom. An affine transformation is equivalent to the composed geometric operations of translation, rotation, isotropic scaling, reflection and shear. The general affine transformation may be represented as below.

$$\begin{bmatrix} x2 \\ y2 \end{bmatrix} = \begin{bmatrix} a_{00} & a_{01} \\ a_{10} & a_{11} \end{bmatrix} \begin{bmatrix} x1 \\ y1 \end{bmatrix} + \begin{bmatrix} b_0 \\ b_1 \end{bmatrix}$$

In this disclosure, predefined geometric operations are selected from those geometric operations that affine transformation could conduct. Some exemplary operations are listed below. In this disclosure, syntax elements are signaled into the bitstreams to indicate which operations are conducted to the original picture or slice. At the decoder, the inverse geometry operations could be conducted according to the syntax elements to transform the modified picture or slice back to the original picture or slice. Alternatively, one or more predefined operations may be performed implicitly without signaling syntax elements and the decoder could also transform the modified picture or slice back to the original one according to the predefined one or more operations.

1. Rotation

In two dimensions, to carry out a rotation using a matrix, the point (x, y) to be rotated counter-clockwise is written as a column vector, then multiplied by a rotation matrix calculated from the angle θ:

$$\begin{bmatrix} x2 \\ y2 \end{bmatrix} = \begin{bmatrix} \cos\theta & -\sin\theta \\ \sin\theta & \cos\theta \end{bmatrix} \begin{bmatrix} x1 \\ y1 \end{bmatrix}$$

2. Scaling $$\begin{bmatrix} x2 \\ y2 \end{bmatrix} = \begin{bmatrix} \cos\theta & -\sin\theta \\ \sin\theta & \cos\theta \end{bmatrix} \begin{bmatrix} x1 \\ y1 \end{bmatrix}$$

3. Reflection about a vertical axis of abscissa x0 in the original image:

$$x2 = -x1 + (2 * x0)$$

$$y2 = y1$$

4. Reflection about a horizontal axis of ordinate y0 in the original image:

$$x2 = x1$$
$$y2 = -y1 + (2 * y0)$$

5. Reflection about an axis oriented in any arbitrary direction θ, and passing through (x0, y0):

$$x2 = x1 + 2 * \Delta * (-\sin\theta)$$
$$y2 = y1 + 2 * \Delta * (\cos\theta)$$
$$\text{where } \Delta = (x1 - x0) * \sin\theta - (y1 - y0) * (\cos\theta)$$

In the second example, since the geometric operations on the picture or slice may change the luma sampling positions and chroma sampling positions, syntax elements are signaled at the picture or slice level (e.g., slice header, picture parameter stem picture header) to indicate the modified luma sample positions and/or the modified chroma sample positions.

After applying the geometric operations, the relative locations of the luma samples and the chroma samples may be changed compared to the original picture or slice. Therefore, to indicate the correct luma sample locations and chroma sample locations, additional syntax elements may be signaled at the picture and/or slice level to indicate the correct samples locations of luma samples and chroma samples. The signaled syntax elements at the picture or slice level work like the syntax elements signaled at sequence level in the VVC specification (such as sps_chroma_horizontal_collocated_flag and sps_chroma_vertical_collocated_flag).

Figure 7:
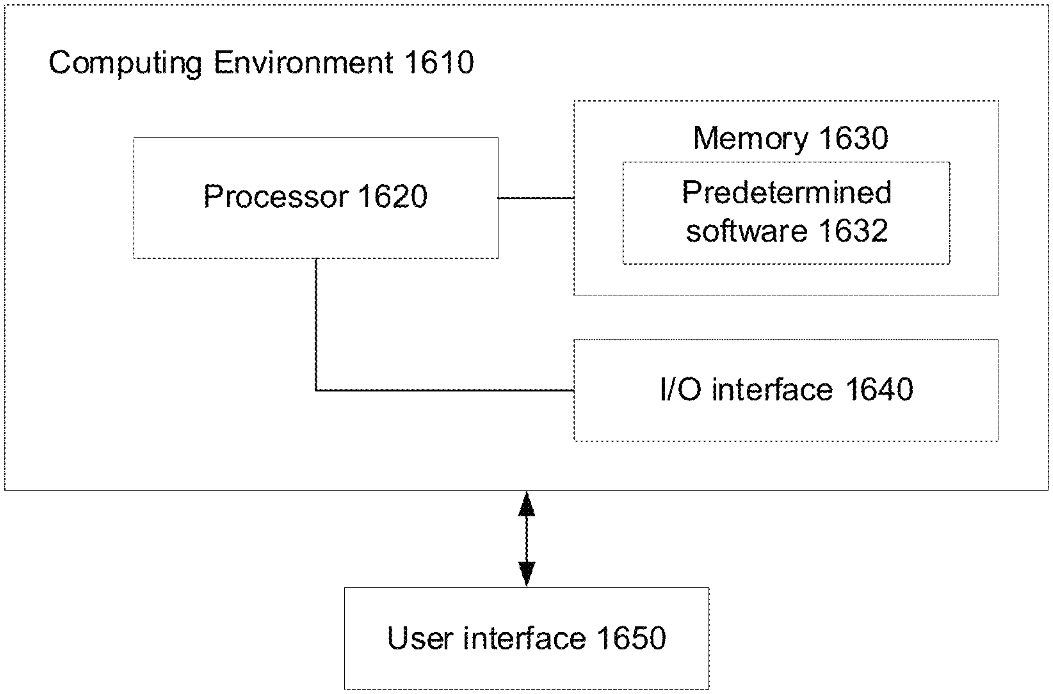
FIG. 7 illustrates a computing environment in accordance with some examples of the present disclosure.

FIG. 7 illustrates a computing environment 1610 coupled with a user interface 1650. The computing environment 1610 can be part of a data processing server. The computing environment 1610 includes a processor 1620, a memory 1630, and an Input/Output (I/O) interface 1640.

The processor 1620 typically controls overall operations of the computing environment 1610, such as the operations associated with display, data acquisition, data communications, and image processing. The processor 1620 may include one or more processors to execute instructions to perform all or some of the steps in the above-described methods. Moreover, the processor 1620 may include one or more modules that facilitate the interaction between the processor 1620 and other components. The processor may be a Central Processing Unit (CPU), a microprocessor, a single chip machine, a Graphical Processing Unit (GPU), or the like.

The memory 1630 is configured to store various types of data to support the operation of the computing environment 1610. The memory 1630 may include predetermined software 1632. Examples of such data includes instructions for any applications or methods operated on the computing environment 1610, video datasets, image data, etc. The memory 1630 may be implemented by using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The I/O interface 1640 provides an interface between the processor 1620 and peripheral interface modules, such as a keyboard, a click wheel, buttons, and the like. The buttons may include but are not limited to, a home button, a start scan button, and a stop scan button. The I/O interface 1640 can be coupled with an encoder and decoder.

The description of the present disclosure has been presented for purposes of illustration and is not intended to be exhaustive or limited to the present disclosure. In some embodiments, modifications, variations, and alternative implementations may be included based on the benefit of the teachings presented in the foregoing descriptions and the associated drawings.

Unless specifically stated otherwise, an order of steps of the method according to the present disclosure is only intended to be illustrative, and the steps of the method according to the present disclosure are not limited to the order specifically described above, but may be changed according to practical conditions. In addition, at least one of the steps of the method according to the present disclosure may be adjusted, combined or deleted according to practical requirements.

The examples were chosen and described in order to explain the principles of the disclosure and to enable others skilled in the art to understand the disclosure for various implementations and to best utilize the underlying principles and various implementations with various modifications as are suited to the particular use contemplated. Therefore, the scope of the disclosure is not to be limited to the specific examples of the implementations disclosed and that modifications and other implementations are intended to be included within the scope of the present disclosure.

Figure 8:
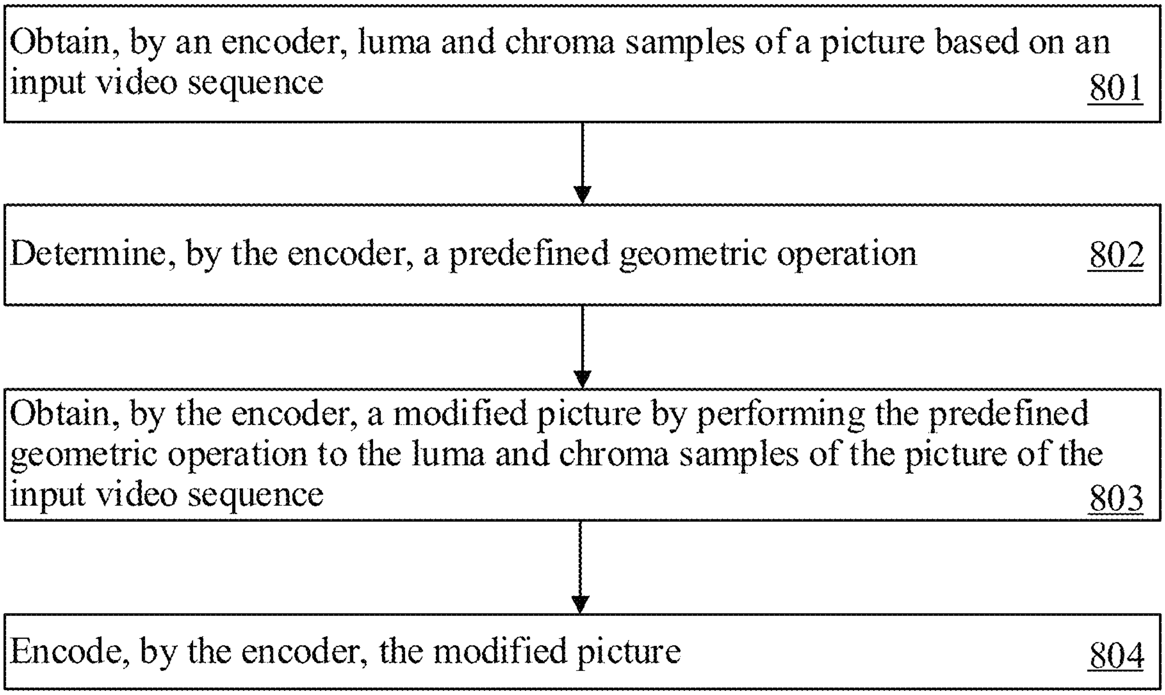
FIG. 8 is a flow chart illustrating a method for video encoding in accordance with some examples of the present disclosure.

FIG. 8 is a flowchart illustrating a method for video encoding according to an example of the present disclosure.

In step 801, the processor 1620, at the encoder side, may obtain luma samples and chroma samples of a picture based on an input video sequence. For example, a predefined geometric operation may be applied to the luma samples and/or chroma samples of each picture (or slice) of the input video sequence to be coded. In some examples, luma samples may have different height or width from chroma samples.

In step 802, the processor 1620, at the encoder side, may determine a predefined geometric operation. For example, the encoder may determine the predefined geometric operation from a pre-stored table. In some examples, the predefined geometric operation may include one or more of following operations: translation, rotation, isotropic scaling, reflection or shear.

In step 803, the processor 1620, at the encoder side, may obtain a modified picture by performing the predefined geometric operation to the luma samples and the chroma samples of the picture of the input video sequence. In some examples, the picture which is applied geometric operation is termed modified picture.

In step 804, the processor 1620, at the encoder side, may encode the modified picture. In some examples, the modified picture may be used as input picture for a video encoder.

In one or more examples, the processor 1620, at the encoder side, may update the associated metadata for the modified picture. The modified picture may have different width or height compared to the original picture. The processor 1620, at the encoder side, may update syntax element for the modified picture and signal syntax elements into bitstreams to indicate which predefined geometric operation is conducted to the picture of the input video sequence.

In some examples, the processor 1620, at the encoder side, may compare relative locations of the luma samples and the chroma samples in the modified picture and relative locations of the luma samples and the chroma samples in the original picture to indicate correct locations of the luma samples and the chroma samples. Further, the encoder may signal syntax elements in the picture of the input video sequence to indicate the correct locations of the luma samples and the chroma samples.

Figure 9:
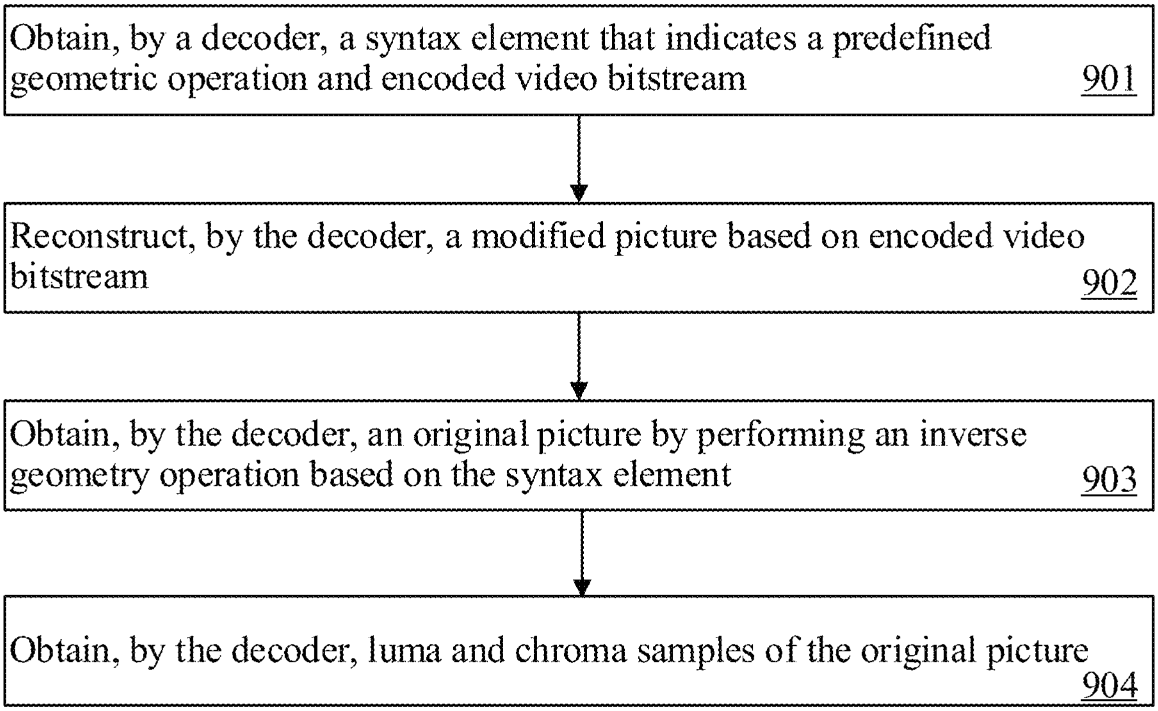
FIG. 9 is a flow chart illustrating a method for video decoding corresponding to the method for video encoding as shown in FIG. 8 in accordance with some examples of the present disclosure.

FIG. 9 is a flowchart illustrating a method for video decoding according to an example of the present disclosure.

In step 901, the processor 1620, at the decoder side, may obtain a syntax element that indicates a predefined geometric operation and encoded video bitstream. In some examples, syntax elements are signaled into the bitstreams to indicate which operations are conducted to the original picture or slice.

In step 902, the processor 1620, at the decoder side, may reconstruct a modified picture based on encoded video bitstream. In some examples, one or more predefined operations may be performed implicitly without signaling syntax elements and the decoder could transform the modified picture or slice back to the original one according to the predefined one or more operations.

In step 903, the processor 1620, at the decoder side, may obtain an original picture by performing an inverse geometry operation based on the syntax element. In some examples, the processor 1620, at the decoder side, may determine the inverse geometry operation corresponding to the predefined geometric operation according to the syntax element. For example, the inverse geometry operations may be conducted according to the syntax elements to transform the modified picture or slice back to the original picture or slice.

In step 904, the processor 1620, at the decoder side, may obtain luma samples and chroma samples of the original picture. In some examples, the processor 1620, at the decoder side, may compare the relative locations of the luma samples and the chroma samples in the modified picture and the relative locations of the luma samples and the chroma samples in the original picture to indicate correct locations of the luma samples and the chroma samples.

In some examples, the processor 1620, at the decoder side, may obtain additional syntax element that indicates the correct locations of luma samples and chroma samples.

In some examples, there is provided an apparatus for video encoding. The apparatus includes a processor 1620 and a memory 1630 configured to store instructions executable by the processor; where the processor, upon execution of the instructions, is configured to perform the method as illustrated in FIG. 8.

In some examples, there is provided an apparatus for video decoding. The apparatus includes a processor 1620 and a memory 1630 configured to store instructions executable by the processor; where the processor, upon execution of the instructions, is configured to perform the method as illustrated in FIG. 9.

In some other examples, there is provided a non-transitory computer readable storage medium, having instructions stored therein. For example, the instructions may be stored as the predetermined software 1632, or a part of the software. When the instructions are executed by a processor 1620, the instructions cause the processor to perform any method as illustrated in FIGS. 8-9. In one example, the plurality of programs may be executed by the processor 1620 in the computing environment 1610 to receive (for example, from the video encoder 20 in FIG. 3B) a bitstream or data stream including encoded video information (for example, video blocks representing encoded video frames, and/or associated one or more syntax elements, etc.), and may also be executed by the processor 1620 in the computing environment 1610 to perform the decoding method described above according to the received bitstream or data stream. In another example, the plurality of programs may be executed by the processor 1620 in the computing environment 1610 to perform the encoding method described above to encode video information (for example, video blocks representing video frames, and/or associated one or more syntax elements, etc.) into a bitstream or data stream, and may also be executed by the processor 1620 in the computing environment 1610 to transmit the bitstream or data stream (for example, to the video decoder 30 in FIG. 3C). Alternatively, the non-transitory computer-readable storage medium may have stored therein a bitstream or a data stream including encoded video information (for example, video blocks representing encoded video frames, and/or associated one or more syntax elements etc.) generated by an encoder (for example, the video encoder 20 in FIG. 3B) using, for example, the encoding method described above for use by a decoder (for example, the video decoder 30 in FIG. 3C) in decoding video data. The non-transitory computer-readable storage medium may be, for example, a ROM, a Random Access Memory (RAM), a CD-ROM, a magnetic tape, a floppy disc, an optical data storage device or the like.

The above methods may be implemented using an apparatus that includes one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus may use the circuitries in combination with the other hardware or software components for performing the above described methods. Each module, sub-module, unit, or sub-unit disclosed above may be implemented at least partially using the one or more circuitries.

This application is intended to cover any variations, uses, or adaptations of the disclosure following the general principles thereof and including such departures from the present disclosure as come within known or customary practice in the art. It is intended that the specification and examples be considered as exemplary only.

It will be appreciated that the present disclosure is not limited to the exact examples described above and illustrated in the accompanying drawings, and that various modifications and changes can be made without departing from the scope thereof.

What is claimed is:

1. A method for video decoding, comprising:

obtaining, by a decoder, a syntax element that indicates a predefined geometric operation and an encoded video bitstream, wherein the encoded video bitstream is obtained by an encoder encoding a modified picture, and the modified picture is obtained by applying the predefined geometric operation to luma samples and chroma samples of an original picture of an input video sequence;

reconstructing, by the decoder, the modified picture based on the encoded video bitstream;

determining, by the decoder, an inverse geometry operation corresponding to the predefined geometric operation according to the syntax element;

obtaining, by the decoder, the original picture by performing the inverse geometry operation on the modified picture; and obtaining, by the decoder, the luma samples and the chroma samples of the original picture.

2. The method for video decoding of claim 1, wherein the syntax element is implicit and not signaled; or, wherein the syntax element is signaled at a picture or slice level.

3. The method for video decoding of claim 1, wherein the syntax element comprises a sps_chroma horizontal_collocated flag that indicates whether chroma sample positions are horizontally shifted relative to corresponding luma sample positions.

4. The method for video decoding of claim 3, wherein the sps_chroma_horizontal_collocated_flag equaling to 1 specifies that a prediction process is configured for the chroma sample positions that are not horizontally shifted relative to the corresponding luma sample positions.

5. The method for video decoding of claim 3, wherein the sps_chroma_horizontal_collocated_flag equaling to 0 specifies that a prediction process is configured for the chroma sample positions that are shifted right by 0.5 in units of luma samples relative to the corresponding luma sample positions.

6. The method for video decoding of claim 3, wherein the sps_chroma_horizontal_collocated_flag equaling to 0 specifies that a prediction process is configured for the chroma sample positions that are shifted right by a predetermined number in units of luma samples relative to the corresponding luma sample positions.

7. The method for video decoding of claim 3, further comprising:

in response to determining that the sps_chroma_horizontal_collocated_flag is not present, inferring the sps_chroma_horizontal_collocated_flag to be equal to 1.

8. The method for video decoding of claim 1, wherein the syntax element comprises a sps_chroma_vertical_collocated flag that indicates whether chroma sample positions are vertically shifted relative to corresponding luma sample positions.

9. The method for video decoding of claim 8, wherein the sps_chroma_vertical_collocated_flag equaling to 1 specifies that a prediction processes is configured for the chroma sample positions that are not vertically shifted relative to the corresponding luma sample positions.

10. The method for video decoding of claim 8, wherein the sps_chroma_vertical_collocated_flag equaling to 0 specifies that a prediction process is configured for the chroma sample positions that are shifted downward by 0.5 in units of luma samples relative to the corresponding luma sample positions.

11. The method for video decoding of claim 8, wherein the sps_chroma_vertical_collocated flag equaling to 0 specifies that a prediction process is configured for the chroma sample positions that are shifted downward by a predetermined number in units of luma samples relative to the corresponding luma sample positions.

12. The method for video encoding of claim 8, further comprising:

in response to determining that the sps_chroma_vertical_collocated flag is not present, inferring the sps_chroma_vertical_collocated_flag to be equal to 1.

13. The method for video decoding of claim 1, wherein the predefined geometric operation comprises at least one of translation, rotation, isotropic scaling, reflection, or shear.

14. The method for video decoding of claim 1, further comprising:

comparing relative locations of the luma samples and the chroma samples in the modified picture and relative locations of the luma samples and the chroma samples in the original picture to indicate correct locations of the luma samples and the chroma samples.

15. The method for video decoding of claim 1, further comprising:

obtaining an additional syntax element that indicates correct locations of the luma samples and the chroma samples.

16. An apparatus, comprising:

one or more processors; and a memory configured to store instructions executable by the one or more processors;

wherein the one or more processors, upon execution of the instructions, are configured to perform a method for video encoding or a method for video decoding;

wherein the method for video encoding comprises:

obtaining a modified picture by applying a predefined geometric operation to luma samples and chroma samples of an original picture of an input video sequence;

signaling a syntax element that indicates the predefined geometric operation for decoding the modified picture, wherein the syntax element is used to instruct the decoder to determine an inverse geometry operation corresponding to the predefined geometric operation to obtain the original picture by performing the inverse geometry operation on the modified picture;

wherein the method for video decoding comprises:

obtaining a syntax element that indicates a predefined geometric operation and an encoded video bitstream, wherein the encoded video bitstream is obtained by an encoder encoding a modified picture, and the modified picture is obtained by applying the predefined geometric operation to luma samples and chroma samples of an original picture of an input video sequence;

reconstructing the modified picture based on the encoded video bitstream;

determining an inverse geometry operation corresponding to the predefined geometric operation according to the syntax element;

obtaining the original picture by performing the inverse geometry operation on the modified picture; and obtaining the luma samples and the chroma samples of the original picture.

17. A non-transitory computer-readable storage medium storing a bitstream formed by instructions which when executed by a computing device having one or more processors, cause the one or more processors to perform a method for video encoding;

wherein the method for video encoding comprises:

obtaining a modified picture by applying a predefined geometric operation to luma samples and chroma samples of an original picture of an input video sequence;

signaling a syntax element that indicates the predefined geometric operation for decoding the modified picture, wherein the syntax element is used to instruct the decoder to determine an inverse geometry operation corresponding to the predefined geometric operation to obtain the original picture by performing the inverse geometry operation on the modified picture;

wherein the bitstream is to be decoded by the decoding method according to claim 1.

18. A method for storing a bitstream, comprising:

performing a method for video encoding to generate a bitstream; and storing the bitstream;

wherein the method for video encoding comprises:

obtaining a modified picture by applying a predefined geometric operation to luma samples and chroma samples of an original picture of an input video sequence;

signaling a syntax element that indicates the predefined geometric operation for decoding the modified picture, wherein the syntax element is used to instruct the decoder to determine an inverse geometry operation corresponding to the predefined geometric operation to obtain the original picture by performing the inverse geometry operation on the modified picture;

wherein the bitstream is to be decoded by the decoding method according to claim 1.

* * * * *